(12) United States Patent
Yoshida

(10) Patent No.: US 7,061,654 B2
(45) Date of Patent: Jun. 13, 2006

(54) IMAGE PROCESSOR, IMAGE PROCESSING METHOD AND STORAGE MEDIUM

(75) Inventor: Hiroyoshi Yoshida, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1033 days.

(21) Appl. No.: 09/793,912

(22) Filed: Feb. 28, 2001

(65) Prior Publication Data

US 2001/0024298 A1    Sep. 27, 2001

(30) Foreign Application Priority Data

Mar. 1, 2000    (JP) .............................. 2000-056368

(51) Int. Cl.
    *H04N 1/32*    (2006.01)
(52) U.S. Cl. ...................... 358/468; 711/167
(58) Field of Classification Search ............... 358/444, 358/1.16, 1.17, 404, 468, 426.05, 1.12; 711/2, 711/115, 104, 100, 101, 111, 167; 710/25, 710/23; 707/530
    See application file for complete search history.

(56) References Cited

U.S. PATENT DOCUMENTS

| | | | | |
|---|---|---|---|---|
| 4,974,192 A | * | 11/1990 | Face et al. ..................... 710/1 |
| 5,576,846 A | * | 11/1996 | Tsukamoto et al. .......... 358/444 |
| 5,586,228 A | * | 12/1996 | Tokishige et al. ........... 358/1.16 |
| 5,600,801 A | * | 2/1997 | Parks et al. .................. 710/301 |
| 5,940,582 A | * | 8/1999 | Akabori et al. ............. 358/1.13 |
| 6,023,343 A | * | 2/2000 | Hoang et al. ............... 358/1.16 |
| 6,161,102 A | * | 12/2000 | Yanagihara et al. ............ 707/3 |
| 6,275,914 B1 | * | 8/2001 | Jeddeloh ...................... 711/158 |
| 6,486,969 B1 | * | 11/2002 | Maruyama ................. 358/1.15 |
| 6,539,500 B1 | * | 3/2003 | Kahle et al. ................... 714/45 |
| 6,708,257 B1 | * | 3/2004 | Bao ............................ 711/154 |
| 6,792,505 B1 | * | 9/2004 | Otterness et al. ........... 711/114 |
| 2001/0034805 A1 | * | 10/2001 | Usui et al. .................... 710/129 |
| 2002/0138156 A1 | * | 9/2002 | Wong et al. .................... 700/8 |
| 2003/0091191 A1 | * | 5/2003 | Watanabe et al. ........... 380/277 |

* cited by examiner

*Primary Examiner*—Jerome Grant, II
(74) *Attorney, Agent, or Firm*—Fitzpatrick, Cella, Harper & Scinto

(57) ABSTRACT

To provide an image processor and an image processing method having enhanced speed of external output to a printer and the like, and a storage medium storing a control program therefor. A time Te(n, k) when the nth image output unit requires image data k is predicted for each image output unit, and a time Tn(k) when an image data controller stores the same image k in a HD on a temporary basis and stores it again in a RAM completely, is calculated. If at least one of all the Te(n, k) is shorter or earlier than the Tn(k), then the image is outputted to each image output unit from the RAM, thereby enabling enhancement of the speed of the FCOT without use of expensive RAM and HD.

61 Claims, 17 Drawing Sheets

IMAGE PROCESSOR, IMAGE PROCESSING METHOD AND STORAGE MEDIUM

BACKGROUND OF THE INVENTION

1. Field of the Invention

The present invention relates to an image processor, an image processing method and a storage medium storing a control program thereof, which are applicable to, for example, a combined copying machine having a high-speed image memory (RAM) and a bulk image memory (Hard disk device: hereinafter referred to as HD).

2. Related Background Art

As generally known, image processors such as combined copying machines must process image data that are read at high speed from scanners and the like. Thus, input image data are stored in a RAM that can be accessed quickly, thereby keeping up with the speed of scanners. Similarly, for output sides, output image data are stored in the RAM, and image data are supplied therefrom to a printer for keeping up with the print speed of the printer.

Furthermore, for a plurality of copies of a manuscript, there has been proposed a technique in which using a HD as a bulk image memory, image data read by a scanner is first stored in the RAM, and is transferred to the HD on a temporary basis, and the image data required for the printer is transferred from the HD to the RAM, and is outputted to the printer, and in this manner the required number of copies are created by reading the manuscript only once.

However, the described technique has a disadvantage in that the FCOT (First Copy On Time; see below), considered as being important for the copying machine, is prolonged because the HD cannot be operated at high speed.

The FCOT referred to is a time interval between the time when a start key of the copying machine is depressed and the time when the first copy is obtained. For example, the RAM that is used for input can be used also as the output RAM, thereby making it possible to speed up the FCOT for only one copy, but for dealing with a plurality of copies of multiple pages, a large-volume RAM is required.

However, RAM is very expensive compared to a HD having the same capacity, and is not practically suitable for commercial production. In a different way, if everything is dealt with using a high-speed HD (such as a RAID), there is a disadvantage in that such a HD is also very expensive.

Furthermore, it can be considered that these conditions will be increasingly strict and the described problem will be larger in the future, due to the enhanced speed and resolution of scanners and printers.

Furthermore, this problem has been described using the copying machine as an example, but it can be considered that in reality, due to complex operations with a facsimile machine and other networks, one input image is supplied to a plurality of output units, and not only to copying machines.

Also, the described problem holds true not only for the copying machine but also for the facsimile machine, a PDL board (printer) and so on. However, the relevant constraints on time and speed are most severe for the copying machine.

SUMMARY OF THE INVENTION

An object of the present invention is to provide an image processor solving the described problem.

The present invention provides an image processor and an image processing method that further enhance the speed of external output to a printer and the like, and a storage medium storing a control program therefor.

Also, another object of the present invention is to provide an image processor and an image processing method that enable the speed of the FCOT to be enhanced as much as possible, and a storage medium storing a control program therefor, using an existing system and being such as to allow for complex operations.

According to one embodiment, these objects are met by providing an image processor that comprises means for inputting image data and storing that data in a RAM. A controller stores in a bulk memory the image data stored in the RAM, and second controlling means store in the RAM the image data stored in the bulk memory, after which the image data is outputted to an external device from the RAM. Third controlling means output the image data stored in the RAM directly to the external device, without operating the first-mentioned controller and the second controlling means. The processor also is provided with means for determining whether or not the third controlling means is to be operated in a given instance, based on whether or not image data can be transmitted to the external device at the earliest time.

More specifically, according to one embodiment, a time $Te(n, k)$ when the nth image output unit requires image data k is predicted for each image output unit, and a time $Tn(k)$ when an image data controller stores the same image k in a HD on a temporary basis and stores it again in a RAM completely, is calculated. If at least one of all the $Te(n, k)$ is shorter or earlier than the $Tn(k)$, then the image is outputted to each image output unit from the RAM, thereby enabling enhancement of the speed of the FCOT without use of expensive RAM and HD.

Other objects and features of the present invention will be apparent from the following specification and drawings.

DETAILED DESCRIPTION OF THE PREFERRED EMBODIMENTS

Hereinafter, the embodiments of the present invention will be described in detail below with reference to the drawings.

First Embodiment

The first embodiment described herein is a image processing device having a RAM in which image data is stored, a HD in which image data is stored, an image input unit in which image data is formed and stored in the RAM, a plurality of image output units to read the image data from the RAM to print on output paper, and an image data controller to store the image data stored in the HD in the RAM according to an output direction of the image output unit, In this embodiment, each image output unit n predicts a time Te(n, k) for which the image data k is required, the image data controller calculates the time Tn(k) for which the same image k is once stored in the HD and complete to store in the RAM again, and, if at least one of all the Te(n, k) is shorter than Tn(k), outputs the image from the RAM of the image input unit to the image output unit to make possible a high speed FCOT without use of an expensive RAM and HD.

Figure 1:
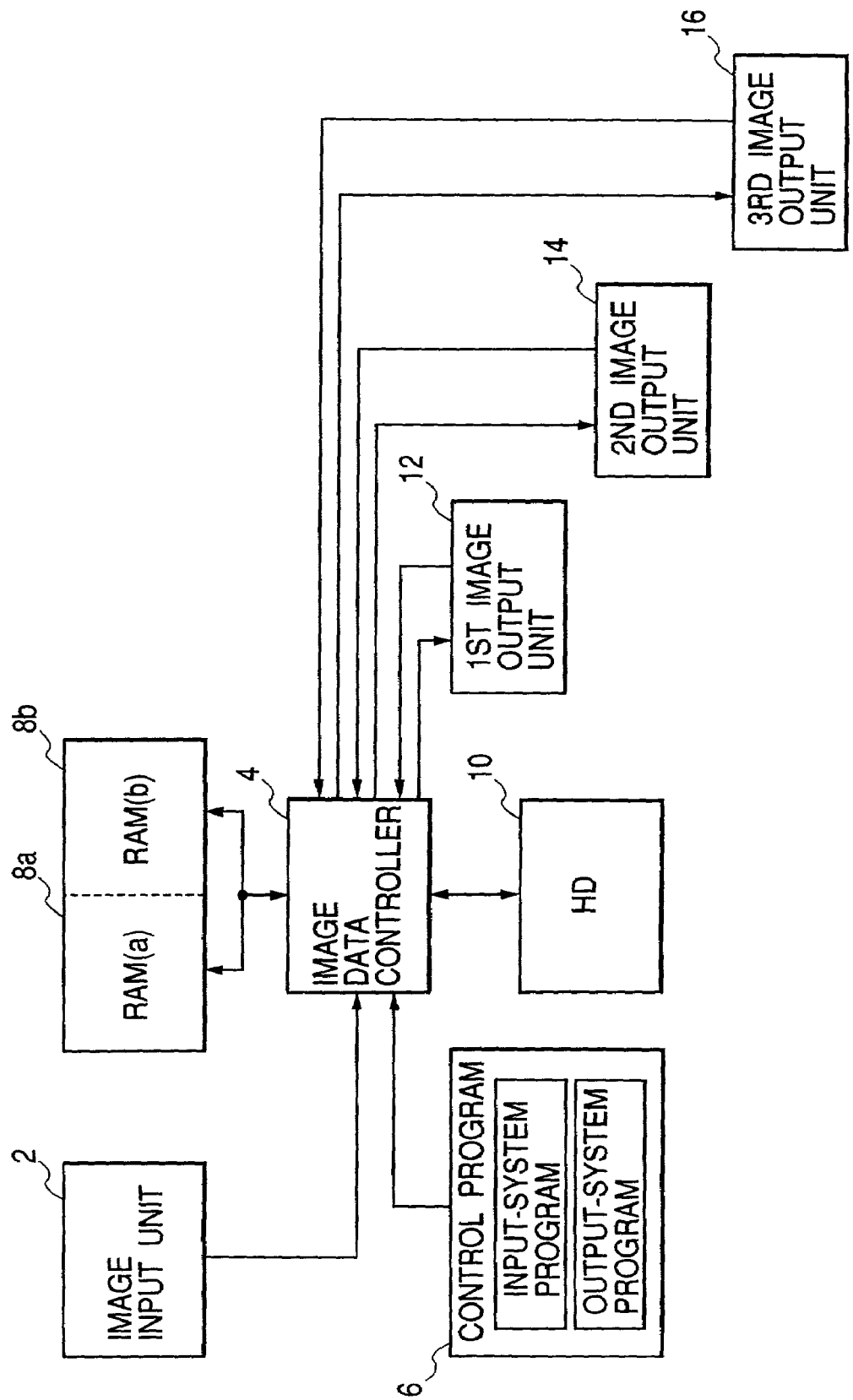
FIG. 1 is a block diagram showing an image processor according to the first embodiment.

FIG. 1 shows the overall configuration of the image processing device as an application of the present invention.

In FIG. 1, reference numeral 2 denotes the image input unit to supply the image data, 4 denotes the image data controller, 6 denotes a program memory in which a controlling program to control the above described image data controller 4 is stored, 8 denotes the RAM to read and write the image data in the high speed, 10 denotes a hard disk (hereafter, "HD") to store a large quantity of the image data, 12 denotes a first image output unit, 14 denotes a second image output unit, and 16 denotes a third image output unit.

In the first embodiment described herein, by separation by the image data controller 4, operations of an image input system and an image output system are carried out almost asynchronously to each other. As mentioned below, these two systems are synchronized in three ways, as follows. Of information used for synchronization, the one type is estimated image information (hereafter, "Estimated Image 103") to provide information relating to input image data, which will be outputted from this to the image output system. The other two kinds are information about counting semaphore (hereafter, "Direct Reading 401") to inform the input system of sharing of the RAM with the output system and to provide information about direct reading completion (hereafter, "Direct Read Completed 402") to inform about timing of completion of sharing of RAM.

In this embodiment, the case where a printer is used for the image output units 12, 14, and 16, will now be described, after which three systems, a normal operation of the input system, a normal operation of the output system, and a RAM sharing operation, will be sequentially described.

Figure 2:
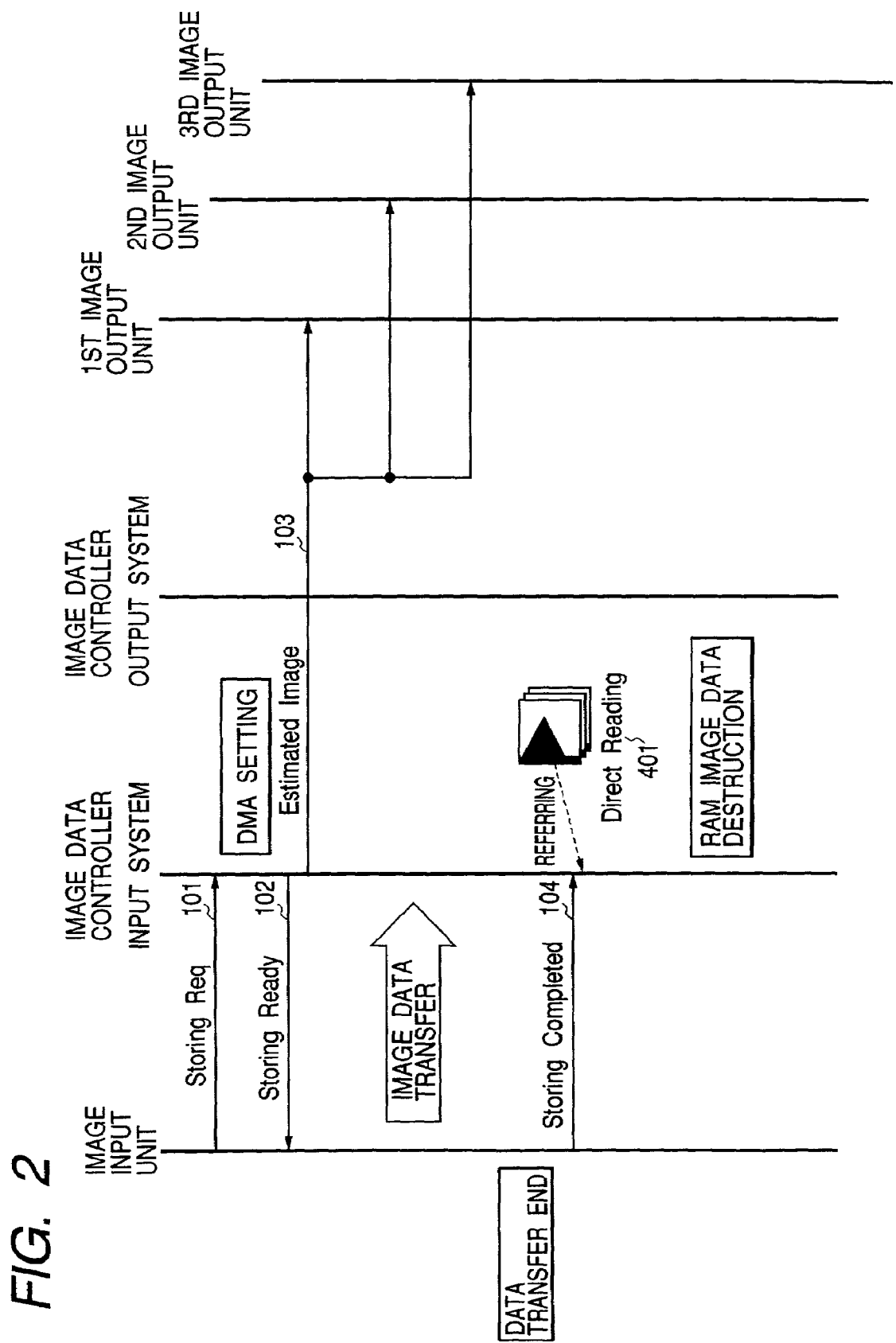
FIG. 2 shows procedures of controlling input-system normal operations in the first embodiment.

First, the normal operation of the input system will be described with reference to FIG. 2.

The image input unit requests a capacity of the image data, which will be prepared since this time, and a position of the HD, in which the data is stored, as storing request information (Storing Req) 101, from the image data controller. Receiving the Storing Req 101, the image data controller surveys any sequence of contiguous memory locations in which the image data requested can be stored in RAM (a) or RAM (b).

If a decision is assumed to be capable of storing in the RAM (a), the image data controller sets an image path A as a source address (specifically, addresses differ according to the image input unit: a fixed address, if it is a scanner and an initial address of the memory which stores an internally developed image, if it is an RIP of a PDL), an image path B (specifically, the initial address of a storing area found in the RAM (a)) as a destination address, and an image size requested, in a DMA controller, not illustrated, as transfer byte numbers.

At the point where preparation is completed for transfer of the image data such as DMA transfer, a storing ready message or information ("Storing Ready") 102 is returned to the image input unit. The image data controller sends Storing Ready 102 to the image input unit and, simultaneously, communicates Estimated Image 103 to all of the first to the third image output units requiring the image. After receiving Storing Ready 102, the image input unit starts to transfer the image data.

When transfer of the image data is completed, the DMA controller generates a data transfer completion interrupt, and the image input unit, after having received this interrupt, conveys a storing completion message or information ("Storing Completed") 104 to the image data controller. The image data controller, after receiving the Storing Completed 104, starts image transfer from the RAM (a) to the HD. Setting of the image data transfer from the image path A to the image path B is carried out for the DMA controller (not illustrated) and a PC1 controller (also not illustrated).

When this transfer is completed, the DMA controller generates a data transfer completion interrupt, and the image data controller, after receiving this interrupt, checks a counting semaphore (Direct Reading) 401 of this image and deletes the image data reserved in the RAM (a), if no one has captured it.

Figure 3:
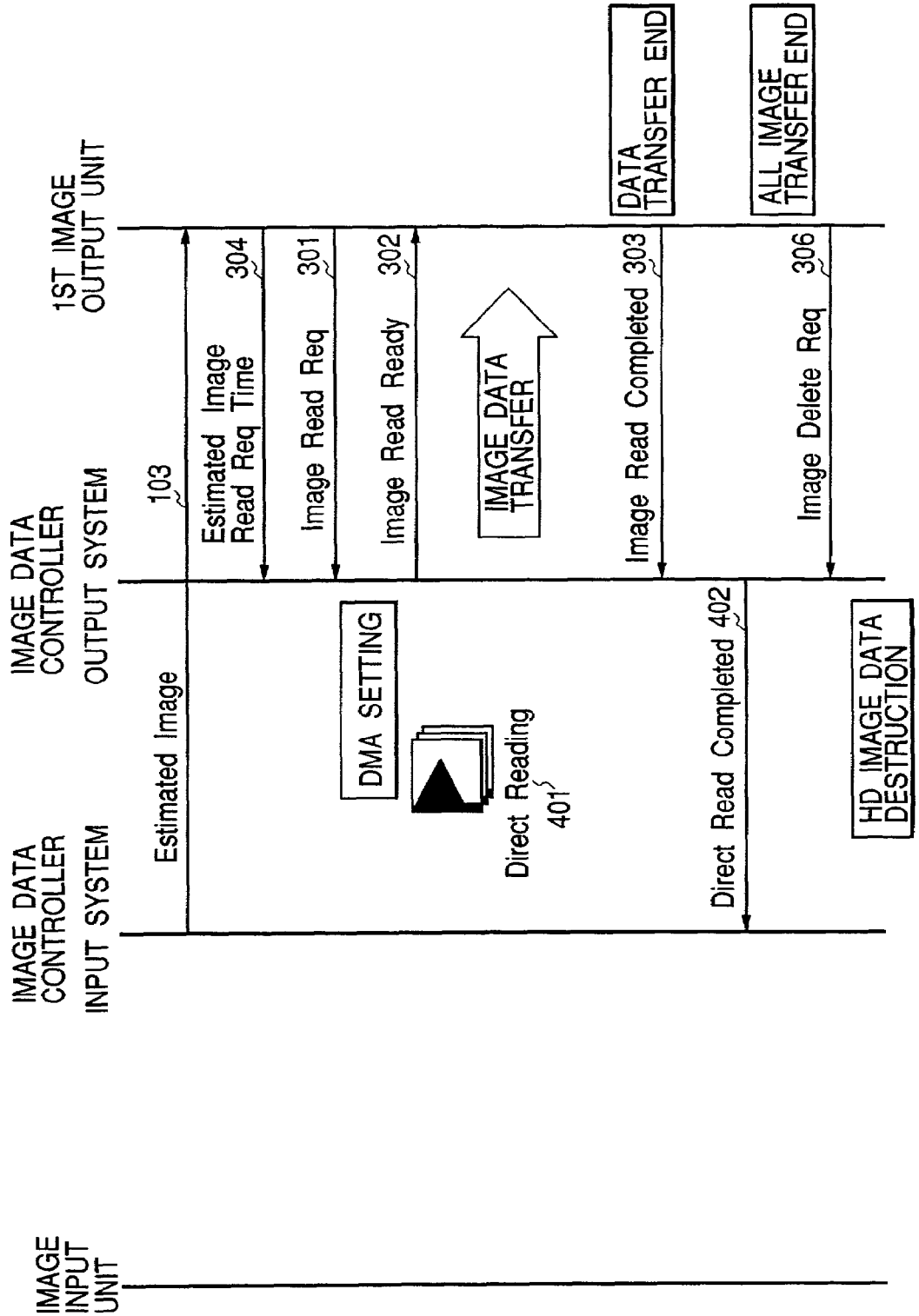
FIG. 3 shows procedures of controlling output system normal operations in the first embodiment.

Next, with reference to FIG. 3, the normal operation of the output system will be described.

At the point at which the Estimated Image 103 is received from the image data controller, the output operation is started. In order to simplify explanation, the image output unit 1 is mainly mentioned, the image output unit 2 and the image output unit 3 being similar to the image output unit 1.

First, print scheduling will be described. The image output unit 1, after receiving the Estimated Image 103, starts to make necessary preparations for outputting its image and simultaneously, reconstructs a printing schedule. If a new image has a higher precedence or priority than the other image data in the print queue, this image data is aligned in a initial position of the print queue, and thus, the output time of all the other image data is resultingly delayed beyond the time predicted. In a case where the most recently received image has the same precedence as others or lower precedence, the new image data is aligned in a position behind the other data in the print queue.

Next, calculation of the request prediction time of the image data will be described. For a part of the print schedule queue that is scheduled to be outputted prior to another image k and for which no image data has yet been read out, the time Tp(k) required for carrying output paper and the inter-paper time Td(k) which has to elapse between output papers are calculated to yield the image data request prediction time Te(k):

$$Te(k)=\text{SUM}(Tp(i)+Td(i))$$

$$i=0 \text{ to } k-1$$

Td(0) is the time for carrying paper from a feeding cassette to a printing position.

This item of information is sought for all images in the print queue to send to the image data controller as image data request prediction time information (Estimated Image Read Req Time) 304 (n=1, 2, 3).

The image data controller stores the Estimated Image Read Req Time 304 (n), which is related to the image data k and returned from respective image output units n (the image output unit 1, the image output unit 2 and the image output unit 3), as Te(n, k), time Tr1(k) for storing the data in the RAM, time Th(k) for writing the data from the RAM to the HD, and time Tr2(k) for writing the data from the HD to the RAM, for the same image data, are sought to calculate a total Tn thereof:

$$Tn(k)=Tr1(k)+Th(k)+Tr2(k)$$

The Tn(k) expresses time for storing once the input image data to the RAM, storing the data to the HD thereafter to output to the image output unit again through the RAM.

Next, a comparison processing will be described. The image data controller first seeks the fastest (shortest) time, Te(k), among the values Te(n, k). When Te(k) is longer than Tn(k), in a status of a RAM sharing operation mentioned later, one of the counting semaphore (Direct Reading) 401 reserved is released and at the point, when all the counting semaphore is released and completed to be stored in the HD, the RAM is destroyed to move to the normal operation of the output system mentioned later. When it is not in the status of the RAM sharing operation, no job is performed. When Te(k) is faster than Tn(k), the RAM sharing operation is executed.

At the point in which preparation of a printer for a video inputting is completed, The image output unit 1 requests image reading request information (Image Read Req) 301 from the image data controller. The image data controller, after receiving this Image Read Req 301, makes preparations to read out the image from the HD. First, the sequence of contiguous memory locations is searched for storing the image designated by RAM (a) and RAM (b). Here, it is assumed that the locations are found from RAM (b).

Next, in the DMA controller (not illustrated) and the PC1 controller (not illustrated), the image data controller uses settings of the initial address of the image data stored in the HD as a source, the initial address of the locations found from RAM (b) as a destination, and size or amount of the image data requested as a transfer byte, to start transfer. When transfer is completed and the data transfer completion interrupt is sent from the DMA controller, the image data controller changes the setting of the DMA from RAM (b) to the image output unit 1.

At the point where the setting of the DMA the controller is completed, the image data controller sends image read ready completion information (Image Read Ready) 302 to the image output unit 1. The image output unit 1, after receiving this Image Read Ready 302, informs the printer of the start of image data transfer. The image output unit 1, in which data transfer is completed and transfer interrupt from the DMA is received, sends image read completion information (Image Read Completed) 303 to the image data controller. After receiving this Image Read Completed 303, the image data controller releases one of the counting semaphores (Direct Reading) 401 of the image. (If nothing has been received, there is no release.)

The image output unit 1 completes the predetermined image output and sends image delete request information (Image Delete Req) 306 for the image data that is now unnecessary to the image data controller. The image data controller, after receiving this Image Delete Req 306, deletes the image designated in the HD.

Figure 4:
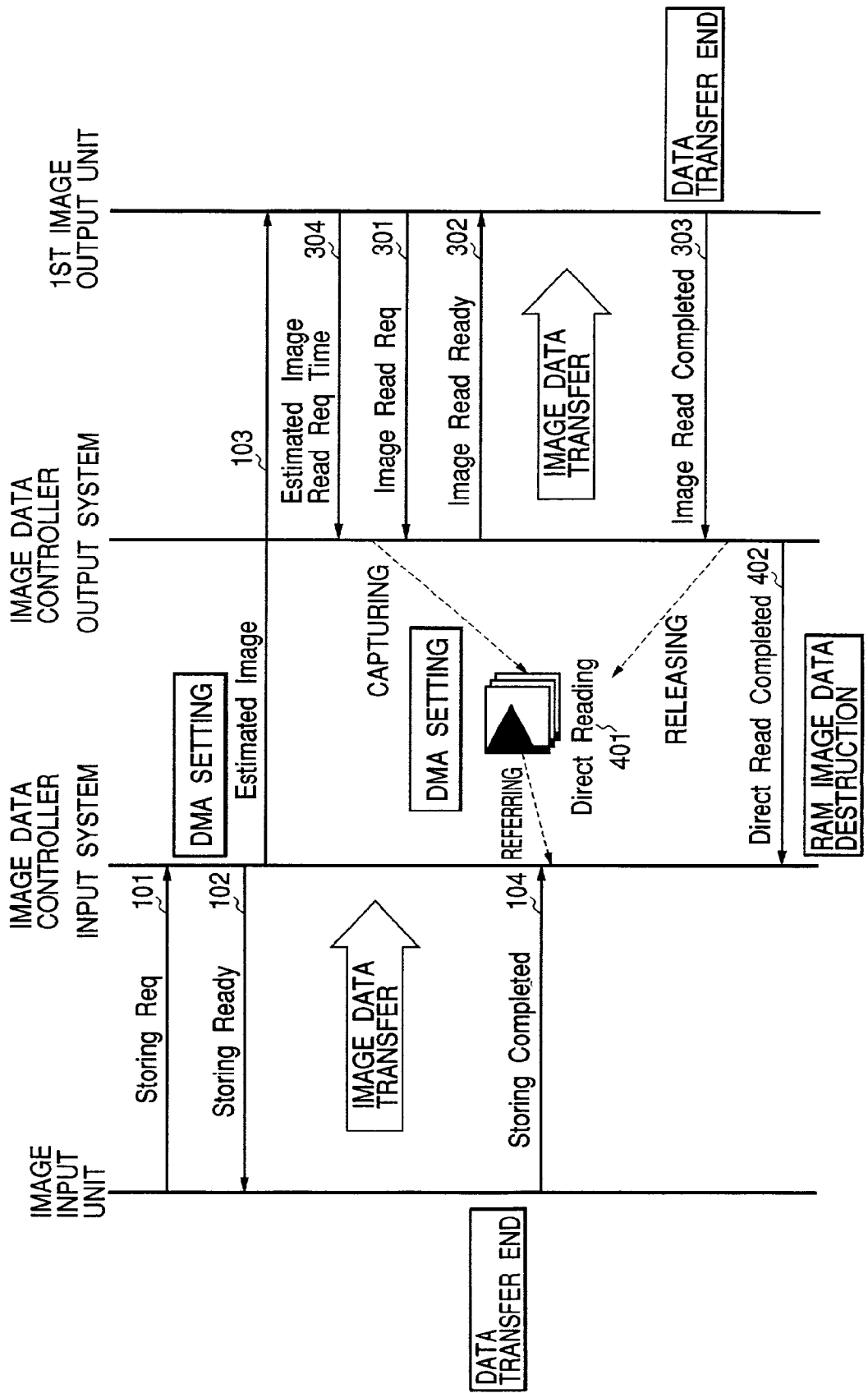
FIG. 4 shows procedures of controlling RAM sharing operations in the first embodiment.

Next, with reference to a FIG. 4, the RAM sharing operation will be described.

When it is decided to execute sharing of the RAM by the input system and the output system, the image data controller first captures one of the counting semaphores (Direct Reading) 401 to prevent destruction of the image data in the RAM after completion of storing by the input system in the HD.

Next, when the output system receives the Image Read Completed 303 for this image, as described above, it releases one of the counting semaphores (Direct Reading) 401. In the input system, at the point of completion of storing in the HD as described above, the counting semaphore (Direct Reading) 401 is checked and when someone has captured this, the input system waits for Direct Read Completed 402 (in the sense of all release of the counting semaphores (Direct Reading) 401) from the output system to delete any contents of the RAM.

In assumption, before completion of the writing from the RAM to the HD, if the Image Read Req 301 is executed on this image several times, then until the Image Read Completed 303 for each of the respective sets of Image Read Req 301 has been received, the image data in the RAM that has been written to the HD cannot be deleted yet even if storage in the HD has been completed.

When the RAM is shared, storing in the HD is parallel executed.

(First Modification of the First Embodiment)

Another example of processing differing from the above described comparative processing steps will be described.

Step 1: first, any one of the values Te(n, k) is extracted as Te(k).

Step 2: when Te(k) is faster (shorter) than Tn(k), comparison is finished, and processing goes to step 4.

Step 3: when Te(k) is longer than Tn(k), then one of the Te(n, k) that has not yet been compared, is designated as Te(k), and processing goes to step 2. If all the Te(n, k) have been compared, comparison is finished, and processing goes to step 4.

Step 4: when Te(k) is longer than Tn(k), sharing operation of the RAM is not necessary. In a status of the RAM sharing operation mentioned later, one of the counting semaphores (Direct Reading) 401 that have been reserved is released, and at the point when all the counting semaphores have been released and storage in the HD completed, the transferred RAM contents are deleted, and the system proceeds to execute the normal operation of the output system mentioned later. When not in the status of RAM sharing operation, however, no job is operated performed. When Te(k) is shorter than Tn(k), the RAM sharing operation is executed.

(Second Modification of the First Embodiment)

In addition, another example of comparative processing steps will be described.

The image data controller compares respective Te(n, k) with Tn(k) to store respective results r(k) as R(n, k).

If none of the Tn(k) is longer than Te(n, k) in R(n, K), in a status of the RAM sharing operation mentioned later, one of the counting semaphores (Direct Reading) 401 that are reserved is released, and at the point when all the counting semaphores have been released and storage in the HD has been completed, the transferred contents of the RAM are deleted, and the system proceeds to execute the normal operation of the output system mentioned later. When it is not in the status of the RAM sharing operation, no job is performed.

If one of the Tn(k) is longer than Te(n, k) in R(n, k), the RAM sharing operation is executed.

(Benefit of the First Embodiment)

In this embodiment, in the image processing device having the RAM in which image data is stored, a HD in which image data is stored, an image input unit in which image data is formed and stored in the RAM, an image output unit to read the image data from the RAM to print on output paper, and an image data controller to store the image data stored in the HD in the RAM according to an output direction of the image output unit, wherein each image output unit n predicts the time Te(n, k) for which the image data k is required, the image data controller calculates the time Tn(k) for which the same image k is once stored in the HD and complete to store in the RAM again and, if at least one of all the Te(n, k) is shorter than Tn(k), outputs the image from the RAM of the image input unit to the image output unit to make possible the high speed FCOT without use of an expensive RAM and HD.

Second Embodiment

The second embodiment described below is the image processing device having RAM in which image data is stored, a HD in which image data is stored, an image input unit in which image data is formed and stored in the RAM, an image output unit to read the image data from the RAM to print image corresponding to the data on output paper, and an image data controller to store the image data stored in the RAM in the HD and, according to the output direction of the image output unit, to store the image data stored in the HD in the RAM. The image processing device has prediction means to predict the time (nonrequest term) until the image output unit requests the image data, starts to store the image data and then seeks the nonrequest term Iv of the image, compares the nonrequest term Iv with time Tn for which the same image is once stored in the HD and completes to store it in the RAM again, and outputs the image from the RAM of the image input unit, when the RAM storing completed time Tn is longer than the nonrequest term Iv, to the image output unit to make possible the high speed FCOT without use of an expensive RAM and HD.

Figure 5:
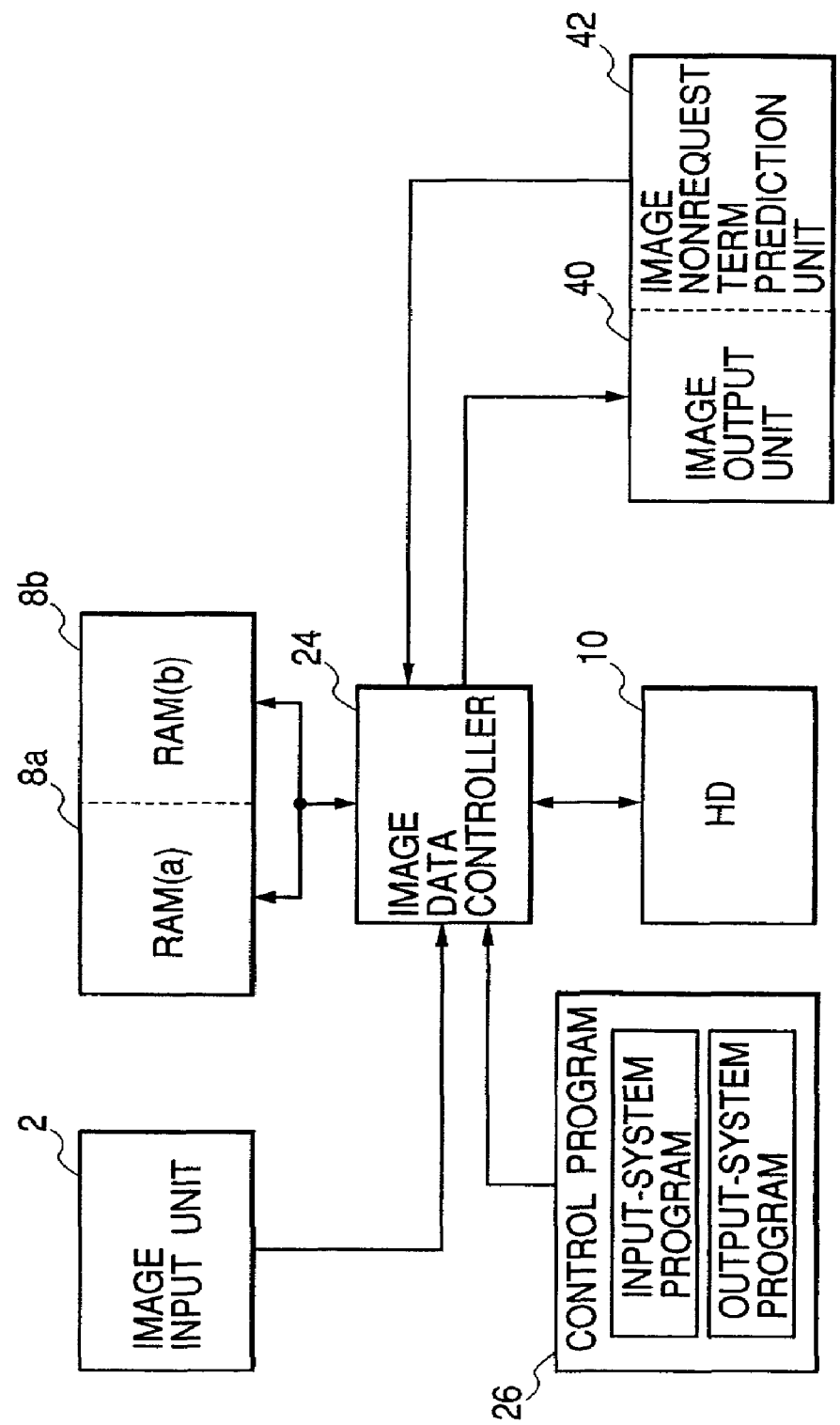
FIG. 5 is a block diagram showing the image processor according to the second embodiment.

FIG. 5 shows the image processing device according to the second embodiment. This second embodiment has, as a rule, the same configuration as that of the first embodiment shown in FIG. 1, but there is a difference in that this embodiment has a non-image request term prediction unit 42 together with the image output unit 40. Consequently, the image data controller 24, in order to execute a control steps described later in detail in FIG. 6 to FIG. 8, executes an operation according to an input system program and an output system program stored in a program memory 26.

Figure 6:
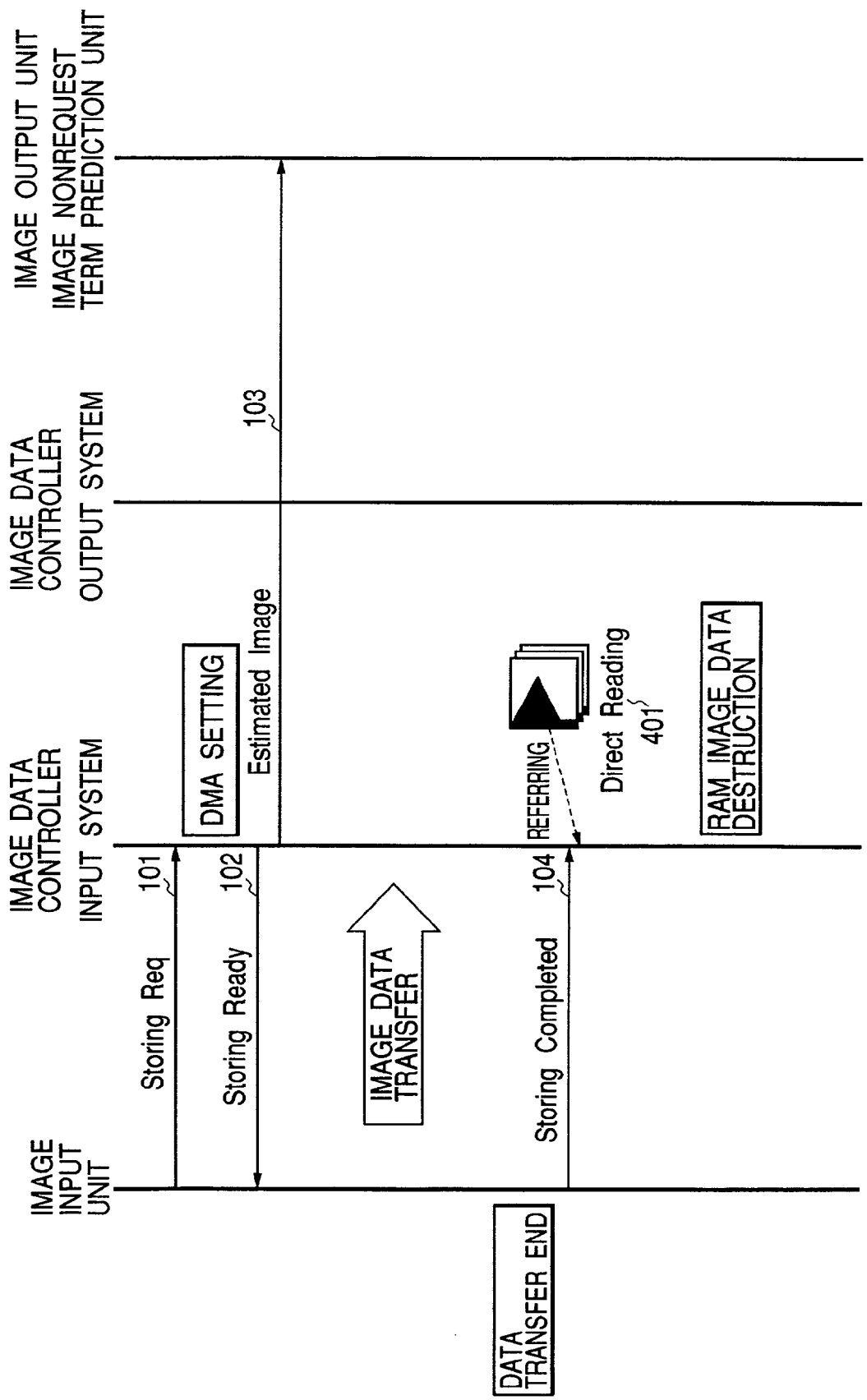
FIG. 6 shows procedures of controlling input-system normal operations in the second embodiment.

First, with reference to FIG. 6, the normal operation of the input system will be described. For reference, various kinds of information communicated between the image data controller, the image input unit, and image output unit have already been described, and hence, signal name (English name) in the drawings will be referred to in this description.

The image input unit requests the capacity of the image data to be prepared and the position of the HD, in which the image data is finally stored, as a Storing Req 101 from the image data controller. The image data controller received this Storing Req 101 searches the sequence of contiguous memory locations capable of storing of the image data requested by RAM (a) or RAM (b).

Assuming that it is decided that storage in RAM (a) is possible at present, then the image data controller sets image path A as the source address (specifically, addresses differ according to the image input unit: the fixed address, if it is the scanner, and instead the initial address of the memory which stores the internally developed image, if it is the RIP of the PDL), image path B (specifically, the initial address of the storing area found in RAM (a)) as the destination address, and the image size requested, in a DMA controller, not illustrated, as the transfer byte numbers.

At the point where preparation has been completed for transfer of the image data (such as DMA transfer), Storing Ready 102 is returned to the image input unit. The image data controller sends Storing Ready 102 to the image input unit and, simultaneously, sends Estimated Image 103 to the image output unit and to an image nonrequest term prediction unit. After receiving Storing Ready 102, the image input unit starts to transfer the image data.

When transfer of the image data is completed, the DMA controller generates the data transfer completion interrupt, and then the image input unit, after receiving this interrupt, sends Storing Completed 104 to the image data controller. The image data controller, after receiving the Storing Completed 104, starts image transfer from RAM (a) to the HD. Setting of the image data transfer from the image path A to the image path B is carried out for the DMA controller (not illustrated) and the PC1 controller (also not illustrated).

When this transfer is completed, the DMA controller generates the data transfer completion interrupt, and then the image data controller, after receiving this interrupt, checks the counting semaphore (Direct Reading) 401 of this image and deletes the image data reserved in RAM (a), the semaphore has not been captured.

Figure 7:
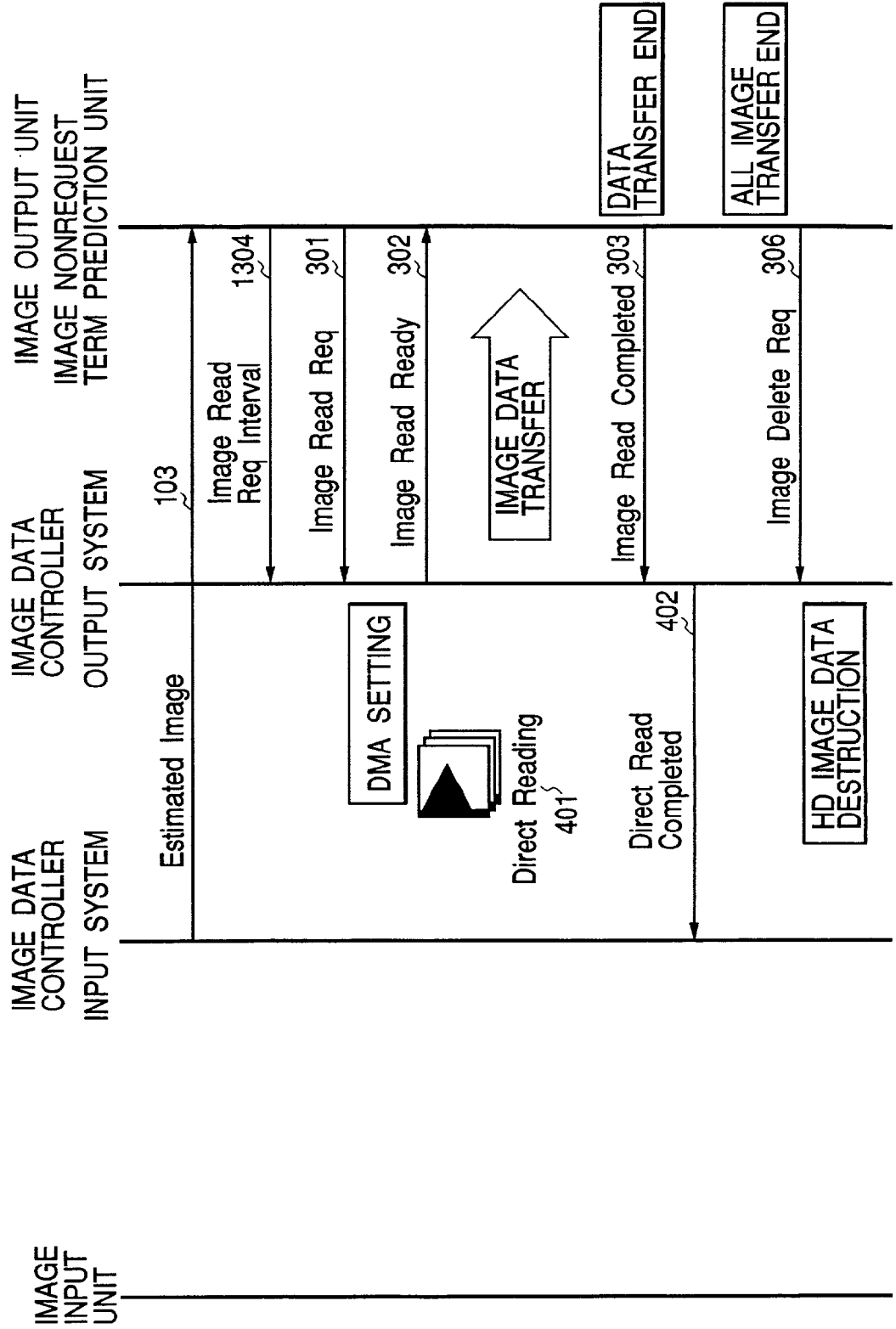
FIG. 7 shows procedures of controlling output system normal operations in the second embodiment.

Next, with reference to FIG. 7, the normal operation of the output system will be described.

At the point where the Estimated Image 103 is received from the image data controller, the output operation is started.

The image output unit and an image nonrequest term prediction unit, after receiving Estimated Image 103, start preparation necessary for image output, and then, in the print schedule queue, to output before image n, for respective data which have not read, seeks time Tp(k) for carrying the output paper and the inter-paper time Td(k), and seeks the image data request prediction term Iv(n) to return this value as Image Read Req Interval 1304 to the image data controller:

$$Iv(n) = \mathrm{SUM}(Tp(i) + Td(i))$$

$$i = 0 \text{ to } -1$$

Td(0) is the time for carrying a sheet of paper from the feeding cassette to the printing position.

The image data controller stores the Image Read Req Interval 1304 returned as Tdirect(n), seeks storing time Tr1(n) of image data n in the RAM, storing time Th(n) in the RAM, and storing time Tr2(n) from the HD to the RAM, and calculates the total Tnormal thereof:

$$Tnormal(n) = Tr1(n) + Th(n) + Tr2(n)$$

The image data controller does nothing when Tdirect(n) is shorter than Tnormal(n).

At the point where video input preparation of the printer is completed, the image output unit requests Image Read Req 301 from the image data controller. The image data controller received Image Read Req 301 prepares reading the image from the HD.

First, the sequence of contiguous memory locations capable of storing specified image data is searched in RAM (a) or RAM (b). It is assumed, by way of example, that the locations are found from RAM (b). The image data controller sets, in the DMA controller (not illustrated) and the PC1 controller (not illustrated) the initial address of the image data stored in the HD as the source, the initial address of the area found in RAM (b) as the destination, and the size of the image data requested as the transfer byte number to start transfer. When transfer is completed and the data transfer completed interrupt is sent from the DMA controller, the image data controller sets the DMA from RAM (b) to the image output unit.

At the point where setting of the DMA by the controller is completed, the image data controller sends Image Read Ready 302 to the image output unit. The image output unit, after receiving this Image Read Ready 302, informs the printer of start of image data transfer. The image output unit, once data transfer is completed and transfer interrupt from the DMA is received, sends Image Read Completed 303 to the image data controller. The image data controller, after receiving this Image Read Completed 303, releases one of the counting semaphores (Direct Reading) 401 of the image. (If nothing has been received, there is no release.) The image output unit completes the predetermined image output and sends Image Delete Req 306 for the image data that is now unnecessary to the image data controller. The image data controller, after receiving this Image Delete Req 306, deletes the image data specified in the HD.

Figure 8:
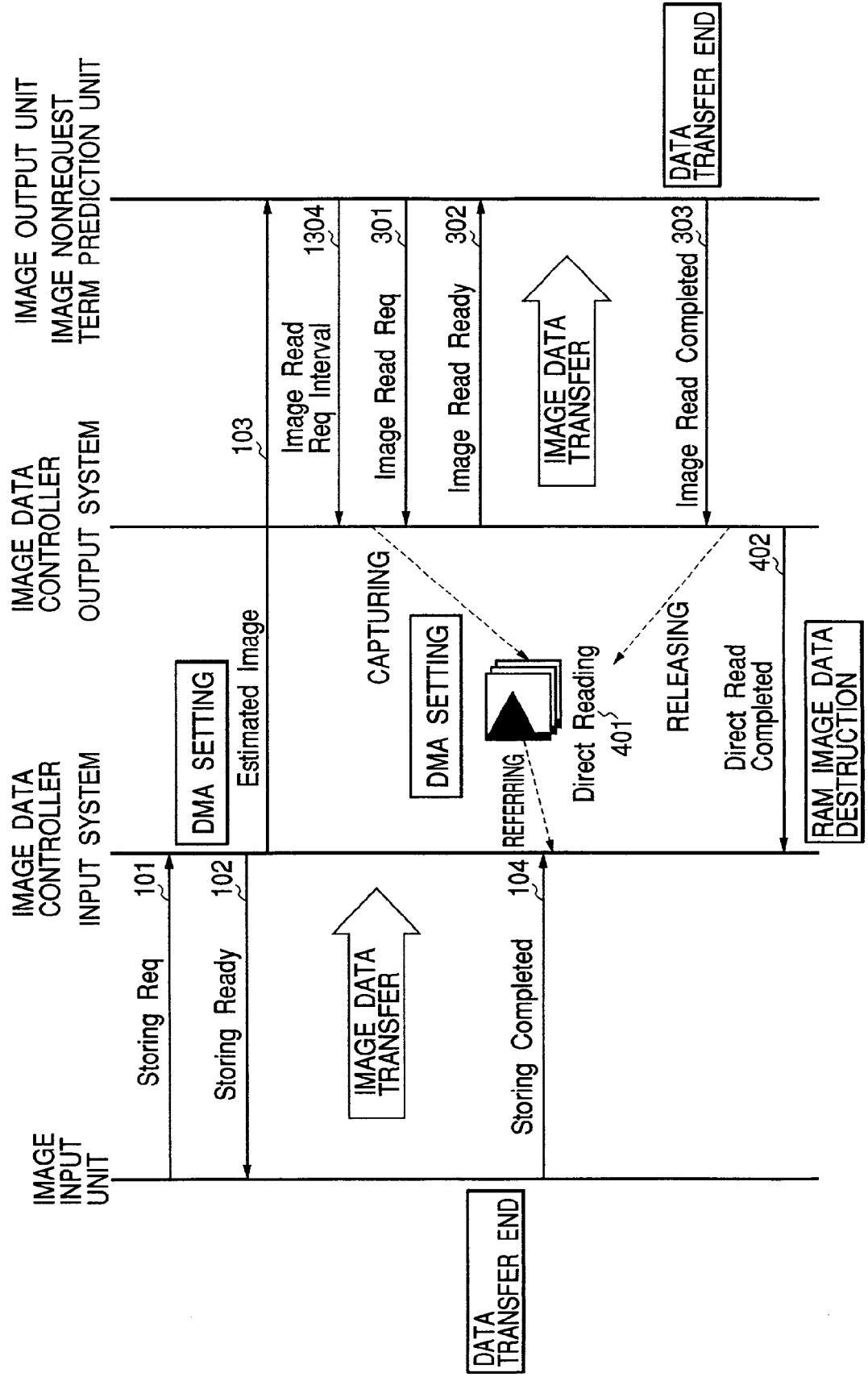
FIG. 8 shows procedures of controlling RAM sharing operations in the second embodiment.

Next, with reference to FIG. 8, the RAM sharing operation will be described.

The image data controller executes sharing of the RAM with the output system, when Tdirect(n) is longer than Tnormal(n). The image data controller first captures one of the counting semaphores (Direct Reading) 401 of this image to prevent deletion of the image data in the RAM after completion of storage of the data by the input system in the HD.

Next, when the output system receives the Image Read Completed 303 for this image, as described above, the output system releases one of the counting semaphores (Direct Reading) 401. The input system, at the point of completion of storage in the HD as described above, checks the counting semaphore (Direct Reading) 401, and if this semaphore been has captured, waits for Direct Read Completed 402 in the sense of release of all the counting semaphores (Direct Reading) 401 from the output system before deleting the contents of the RAM.

In assumption, before completion of writing of the data from the RAM to the HD, if the Image Read Req 301 is executed on the image in question several times, until the Image Read Completed 303 for each of the respective sets of Image Read Req 301 is received, the contents of the RAM cannot be deleted even if storage of the data in the HD has been completed.

When the RAM is shared, storage in the HD is parallel executed.

(Benefit of the Second Embodiment)

According to this embodiment, the image processing device has a RAM in which image data is stored, a HD in which image data is stored, an image input unit in which image data is formed and stored in the RAM, an image output unit to read the image data from the RAM to print the data on output paper, and an image data controller to write the image data stored in the RAM in the HD and, according to the output direction of the image output unit, the image data stored in the HD in the RAM. The image processing device has prediction means to predict the time (nonrequest term) until the image output unit requests the image data, starts to store the image data and then seeks the nonrequest term Iv of the image, compares the nonrequest term Iv with time Tn for which the same image is once stored in the HD and completes storage of it in the RAM again, and outputs the image from the RAM of the image input unit, when the RAM storing completed time Tn is longer than the nonrequest term Iv, to the image output unit to make possible the high speed FCOT without use of expensive RAM and HD.

Third Embodiment

The third embodiment, described below, is an image processing device having a RAM in which image data is stored, a HD in which image data is stored, an image input unit in which image data is formed and stored in the RAM, an image output unit to read the image data from the RAM to print the data on output paper, and an image data controller to write the image data stored in the RAM in the HD and, according to the output direction of the image output unit, the image data stored in the HD in the RAM. The image processing device has prediction means to predict the time until the image output unit requests the image data, starts to store the image data and then seeks the predicted time of the image, compares the predicted time with time for which the same image is stored in the HD and completes storage of that image in the RAM again, and outputs the image from the RAM of the image input unit, when the RAM storing completed time is longer than the predicted time, to the image output unit to make possible the high speed FCOT without use of expensive RAM and HD.

Figure 9:
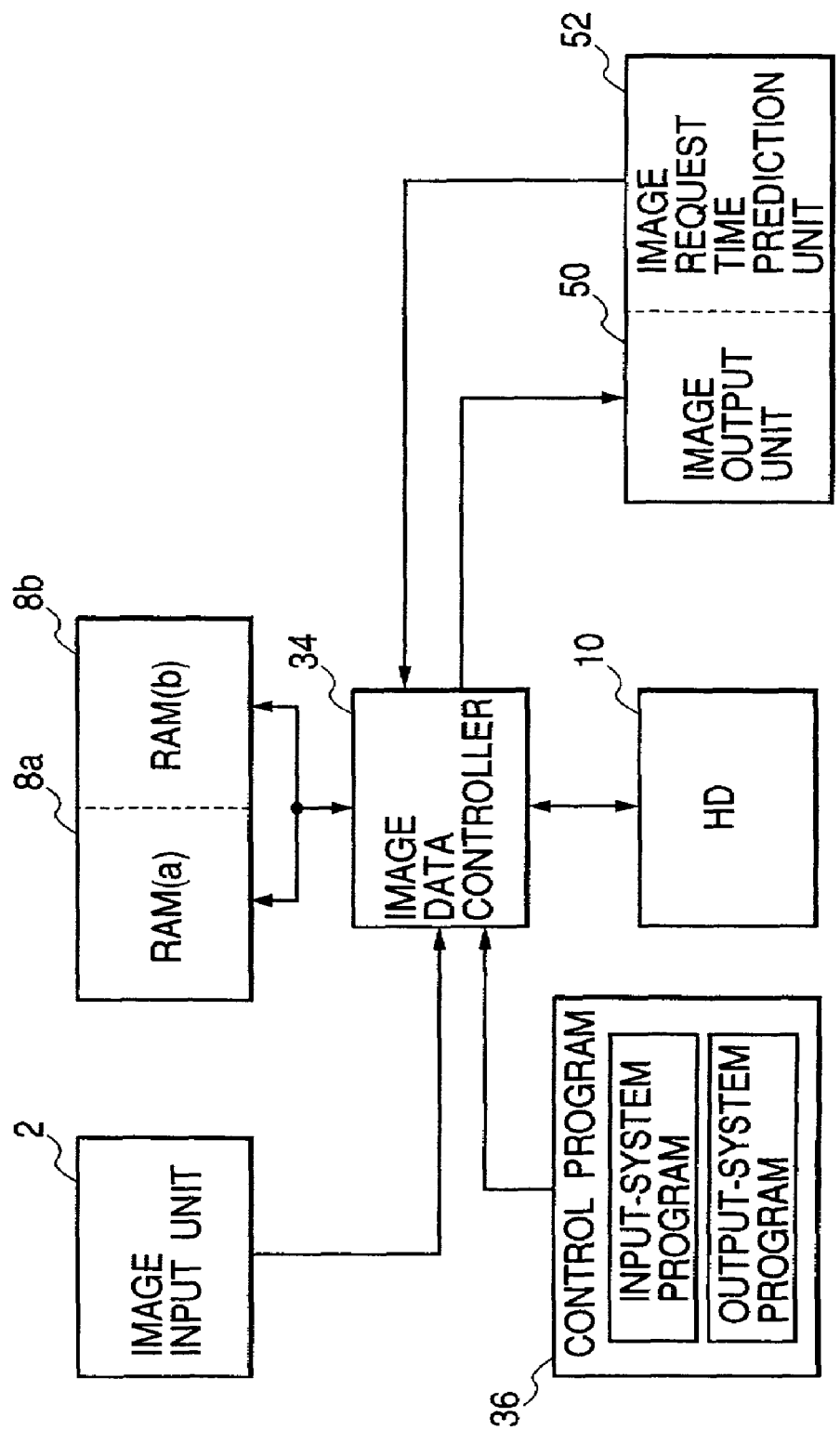
FIG. 9 is a block diagram showing the image processor according to the third embodiment.

FIG. 9 shows the image processing device according to the third embodiment. This third embodiment has, as a rule, the same configuration as that of the first embodiment shown in FIG. 1, however, there is a difference in having the non-image request time prediction unit 52 together with the image output unit 50. Consequently, the image data controller 34, in order to executes the control steps described later in detail in a FIG. 10 to FIG. 12, executes the operation according to the input system program and the output system program stored in a program memory 36.

Figure 10:
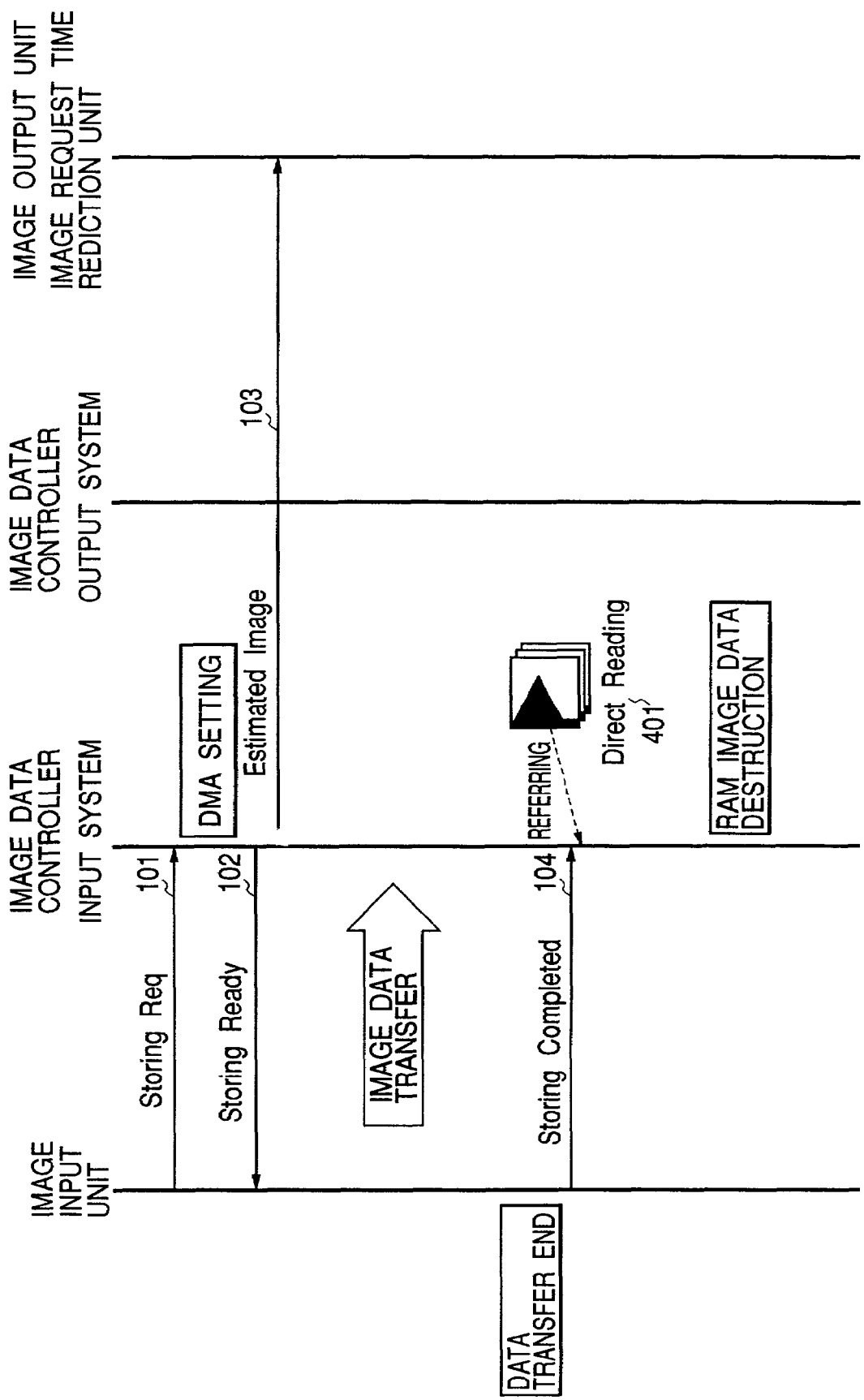
FIG. 10 shows procedures of controlling input-system normal operations in the third embodiment.

First, with reference to FIG. 10, the normal operation of the input system will be described.

The image input unit sends a request for the capacity of the image data to be prepared and the position of the HD in which the image data is finally stored, as the Storing Req 101 to the image data controller. The image data controller, after receiving this Storing Req 101, searches the sequence of contiguous memory locations capable of storing the image data requested by RAM (a) or RAM (b).

Now, assuming that it has been decided that storage in RAM (a) is possible, then the image data controller sets image path A as the source address (specifically, addresses differ according to the image input unit: the fixed address, if it is the scanner, and instead the initial address of the memory which stores the internally developed image, if it is the RIP of the PDL), image path B (specifically, the initial address of the storing area found in the RAM (a)) as the destination address, and the image size requested, in the DMA controller (not illustrated) as the transfer byte numbers.

At the point where preparation is completed for transfer of the image data such as DMA transfer, a signal Storing Ready 102 is returned to the image input unit. The image data controller sends Storing Ready 102 to the image input unit and, simultaneously, sends Estimated Image 103 to the image output unit and the image request time prediction unit.

After receiving Storing Ready 102, the image input unit starts to transfer the image data.

When transfer of the image data is completed, the DMA controller generates the data transfer completion interrupt, and then, after receiving this interrupt, the image input unit sends Storing Completed 104 to the image data controller. The image data controller, after receiving the Storing Completed 104, starts image transfer from RAM (a) to the HD. Setting of the image data transfer from image path A to image path B is carried out for the DMA controller (not illustrated) and the PC1 controller (also not illustrated).

When this transfer is completed, the DMA controller generates the data transfer completion interrupt, and then, after receiving this interrupt, the image data controller checks the counting semaphore (Direct Reading) 401 of this image and deletes the image data reserved in the RAM (a), if the semaphore has not been captured.

Figure 11:
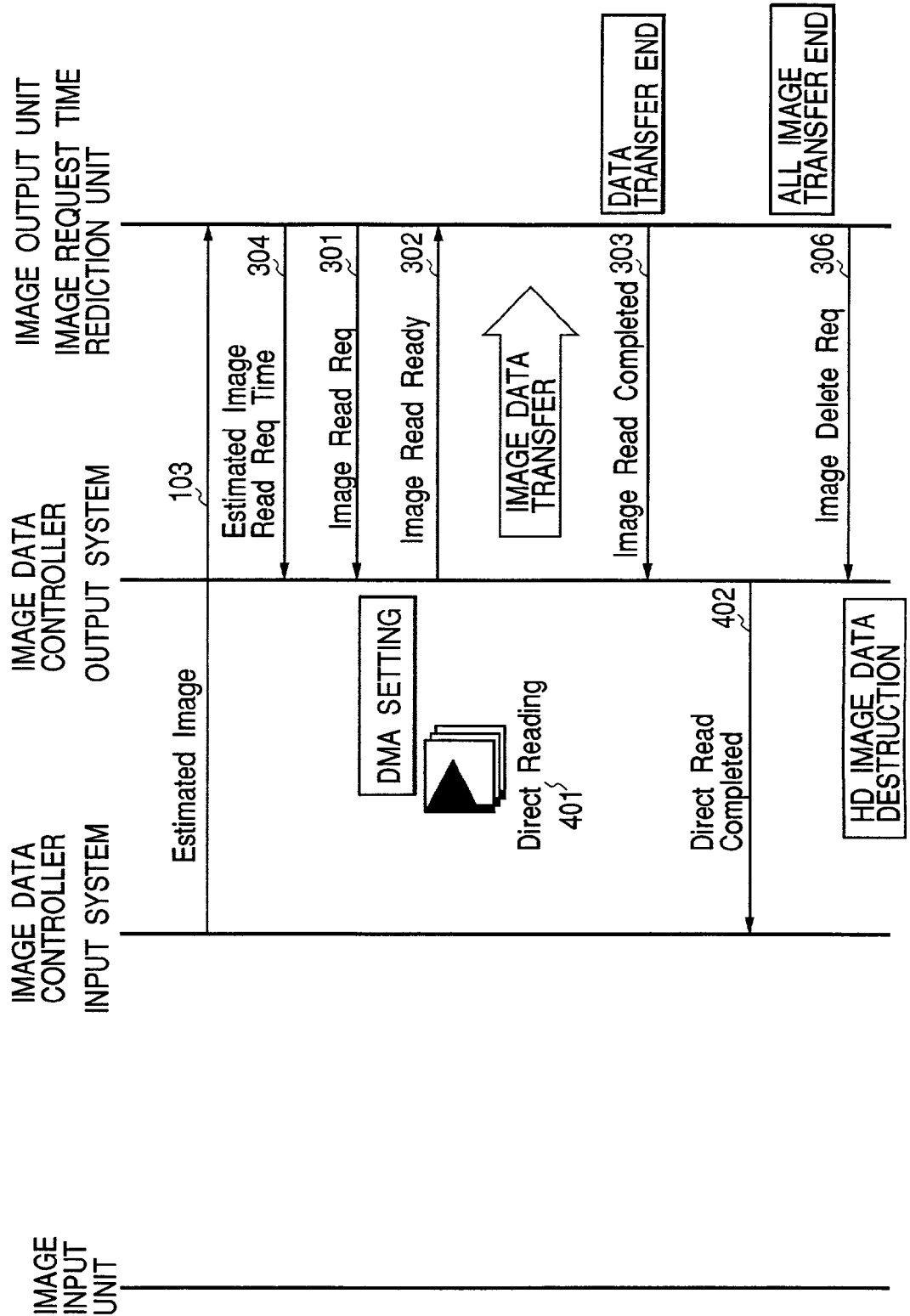
FIG. 11 shows procedures of controlling output system normal operations in the third embodiment.

Next, with reference to FIG. 11, the normal operation of the output system will be described.

At the point the Estimated Image 103 is received from the image data controller, the output operation is started.

The image output unit and the image request time prediction unit, after receiving Estimated Image 103, start preparations necessary for image output, and then, in the print schedule queue, to output before image n, for respective data which have not been read, seek the inter-paper time Td(k) that must intervene between successive sheets of paper, and seek the image data request prediction time Te(n), and return this value as Estimated Image Read Req Time 304 to the image data controller:

$$Te(n)=\text{SUM}(Tp(i)+Td(i))$$

i=0 to -1

Td(0) is the time for carrying paper from the feeding cassette to the printing position.

The image data controller stores the Estimated Image Read Req Time 304 returned as Tdirect(n), seeks storing time Tr1(n) of image data n in the RAM, storing time Th(n) from the RAM to the HD, and storing time Tr2(n) from the HD to the RAM, and calculates the total Tnormal thereof:

$$Tnormal(n)=Tr1(n)+Th(n)+Tr2(n)$$

The image data controller does nothing when Tdirect(n) is longer than Tnormal(n).

At the point where video input preparation of the printer is completed, the image output unit requests Image Read Req 301 from the image data controller. The image data controller, after receiving Image Read Req, 301 prepares reading the image from the HD.

First, the sequence of contiguous memory locations capable of storing specified image data is searched in RAM (a) or RAM (b). It is assumed that, by way of example, the locations are found in RAM (b). The image data controller sets, in the DMA controller (not illustrated) and the PC1 controller (not illustrated), the initial address of the image data stored in the HD as the source, the initial address of the area found in RAM (b) as the destination, and the size of the image data requested as the transfer byte number to start transfer. When transfer is completed and the data transfer completed interrupt is sent from the DMA controller, the image data controller changes setting of the DMA from RAM (b) to the image output unit.

At the point where setting of the DMA controller is completed, the image data controller sends Image Read Ready 302 to the image output unit. The image output unit, after receiving this Image Read Ready 302, informs the printer of the start of image data transfer. The image output unit, in which data transfer is completed and transfer interrupt from the DMA is received, sends Image Read Completed 303 to the image data controller. The image data controller then releases one of the counting semaphores (Direct Reading) 401 of the image. (If nothing has been received, there is no release.) The image output unit completes the predetermined image output and sends Image Delete Req 306 for the image data that is now unnecessary to the image data controller. The image data controller, after receiving this Image Delete Req 306, deletes the image data specified in the HD.

Figure 12:
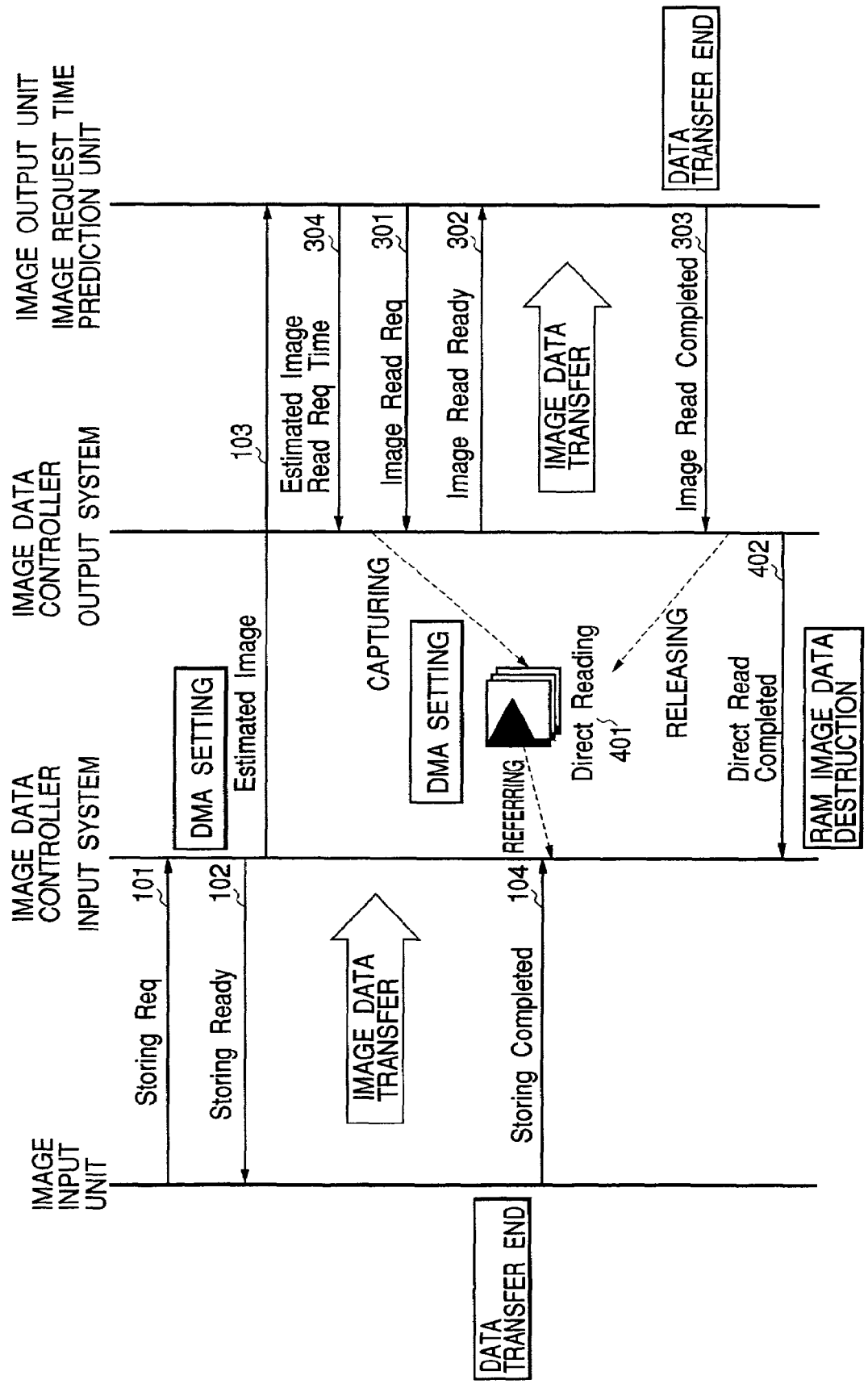
FIG. 12 shows procedures of controlling RAM sharing operations in the third embodiment.

Next, with reference to FIG. 12, the RAM sharing operation will be described.

The image data controller executes sharing of the RAM with the output system, when Tdirect(n) is shorter than Tnormal(n). The image data controller first captures one of the counting semaphores (Direct Reading) 401 of this image to prevent deletion of the image data in the RAM after completion of storing by the input system in the HD.

Next, when the output system receives the Image Read Completed 303 for this image, as described above, the output system releases one of the counting semaphores (Direct Reading) 401. In the input system, at the point of completion of storing in the HD as described above, the counting semaphore (Direct Reading) 401 is checked and if it has been captured, the input system waits for the Direct Read Completed 402 indicating the release of all the counting semaphores (Direct Reading) 401 from the output system before deleting the contents of the RAM.

If, before completion of storing operation from the RAM to the HD, if the Image Read Req 301 is performed this image several times, then until the Image Read Completed 303 for each of the respective sets of Image Read Req 301 is received, the contents of the RAM cannot be deleted even if storage in the HD has been completed.

The image data controller, in the status of executing sharing of the RAM with the output system, releases one of the counting semaphores (Direct Reading) 401 that have been reserved, and deletes the contents of the RAM, when no image request comes after the predicted image request time Tdirect(n) has passed When the RAM is shared, storing in the HD is parallel executed.

(Benefit of the Third Embodiment)

According to the third embodiment, the image processing device has a RAM in which image data is stored, a HD in which image data is stored, an image input unit in which image data is formed and stored in the RAM, an image output unit to read the image data from the RAM to print the data on output paper, and an image data controller to write the image data stored in the RAM in the HD and, according to the output direction of the image output unit, the image data stored in the HD in the RAM. The image processing device has prediction means to predict the time until the image output unit requests the image data, starts to store the image data and then seeks the predicted time of the image, compares the predicted time with the time for which the same image is stored in the HD and completes storage thereof in the RAM again, outputs the image from the RAM of the image input unit, when the RAM storing completed time is longer than the predicted time, to the image output unit, and the RAM is released, when the image data is not requested after the predicted time Te has passed, to make possible the high speed FCOT without use of expensive RAM and HD.

Fourth Embodiment

The fourth embodiment described below is an image processing device having an RAM in which image data is stored, an HD in which image data is stored, an image input unit in which image data is formed and stored in the RAM, an image output unit to read the image data from the RAM to print the data on output paper, and an image data controller to store the image data stored in the RAM in the HD and, according to the output direction of the image output unit, the image data stored in the HD in the RAM. On the basis of a scheduler to decide the order in which to output the image output from image information and scheduling information from the scheduler in completion of the schedule, the image processing device has prediction means to predict time until the image output unit requests each image data, starts to store the image data and simultaneously send image information to the scheduler, executes scheduling, seeks the predicted time Te(n) of each image, compares the predicted time of the image (k), which has been stored in the RAM or will be stored in the RAM, with time Tn(k), for which the same image is once stored in the HD and completes storage thereof in the RAM again, outputs the image from the RAM of the image input unit, when the RAM storing completed time Tn(k) is later than the predicted time Te(k), to the image output unit, the contents of the RAM are deleted by awaiting storage of the image, if the image has not been stored in the HD, or immediately for an image storage of which in the HD has been completed, when the predicted time Te(k) is longer than the RAM storing completed time Tn(k), to make possible the high speed FCOT without use of expensive RAM and HD.

Figure 13:
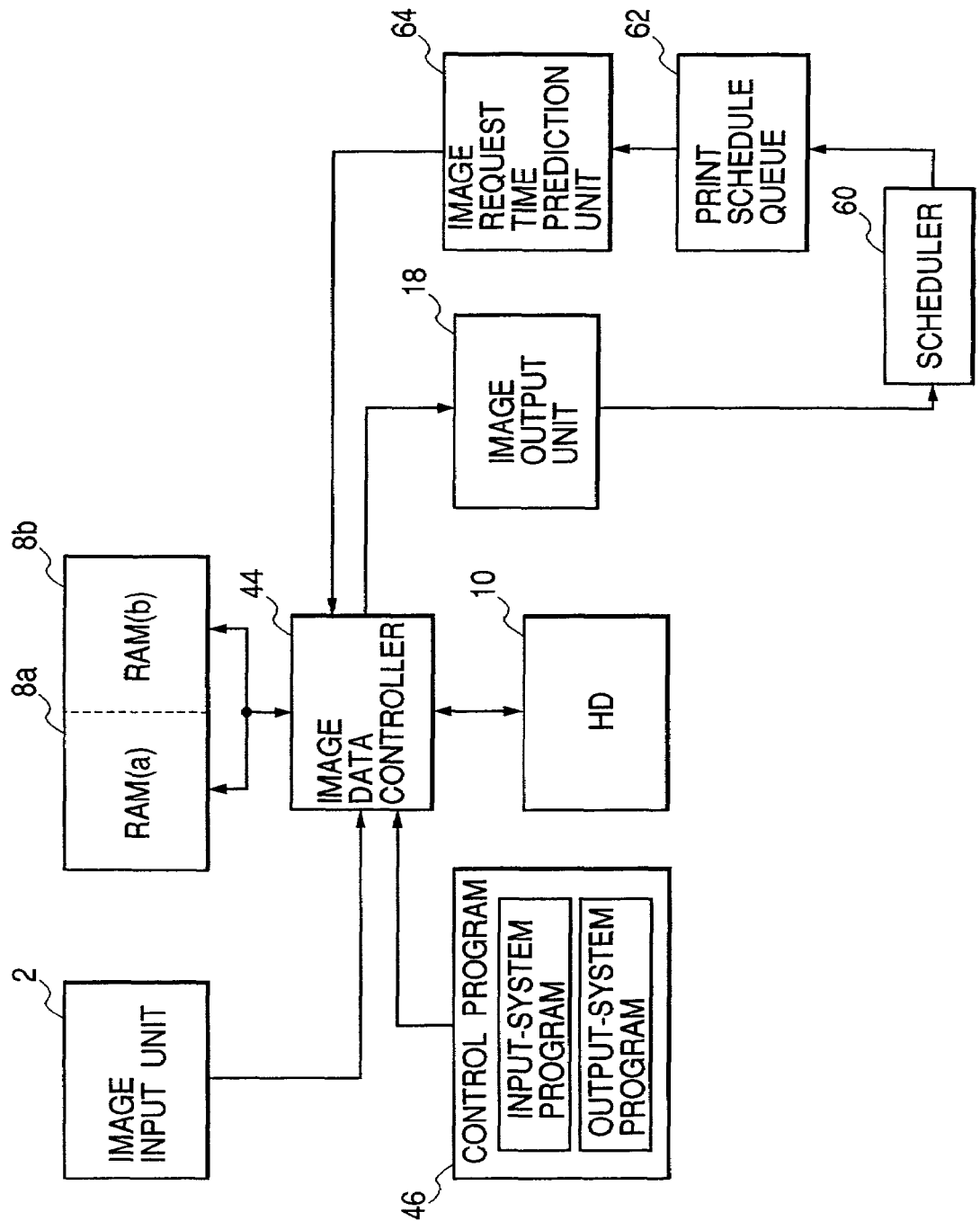
FIG. 13 is a block diagram showing the image processor according to the fourth embodiment.

FIG. 13 shows an image-processing device according to the fourth embodiment. This fourth embodiment has essentially the same configuration as does the first embodiment shown in FIG. 1, but there is a difference in that the fourth embodiment has a scheduler 60, a print schedule queue 62 and an image request time prediction unit 64 in addition to the image output unit 18. Consequently, the image data controller 44, in order to execute the control steps described later in detail with reference to FIGS. 14 to 16, executes the operation according to the input system program and the output system program stored in a program memory 46.

Figure 14:
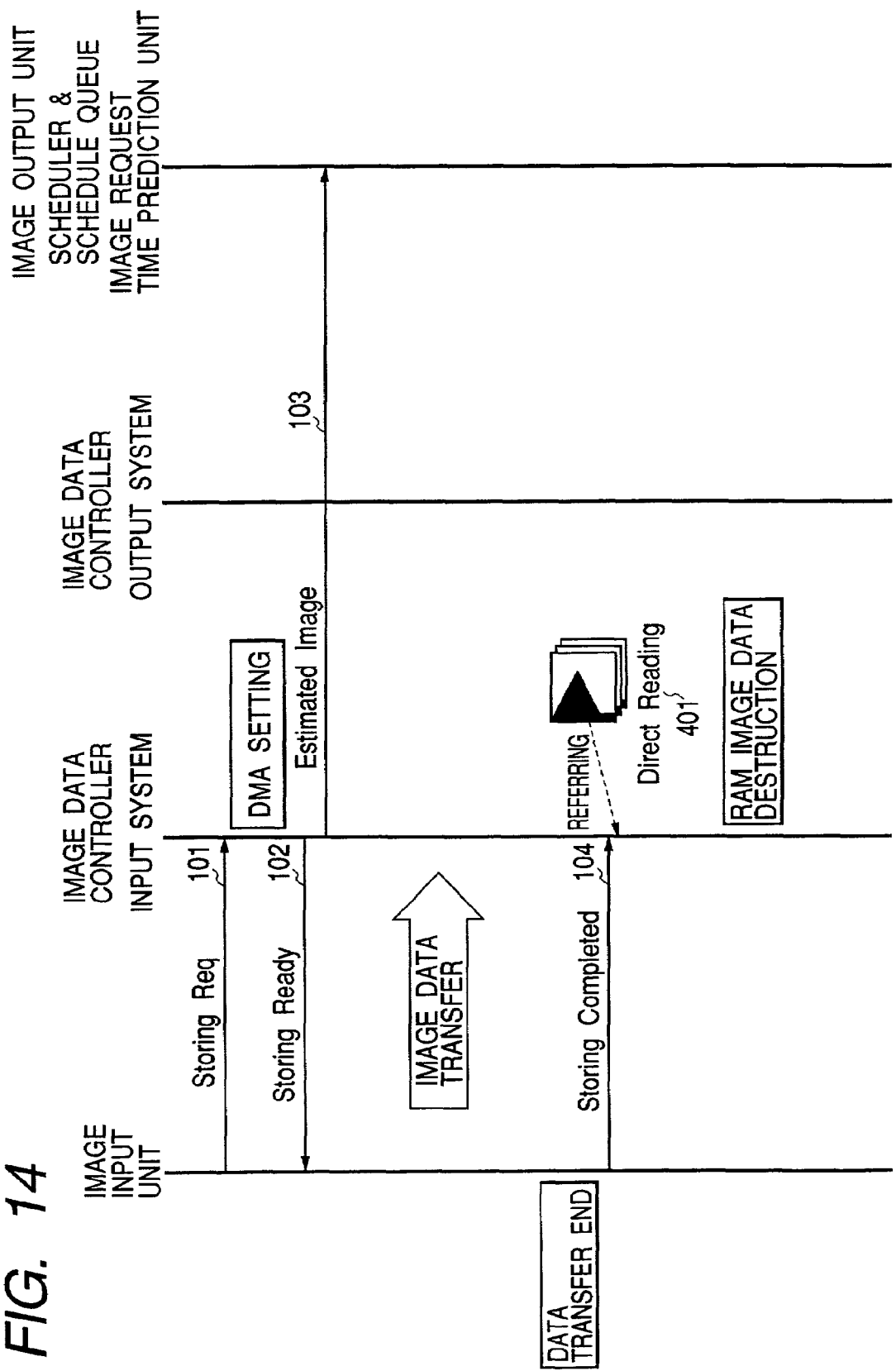
FIG. 14 shows procedures of controlling input-system normal operations in the fourth embodiment.

First, with reference to FIG. 14, the input system normal operation will be described.

The image input unit requests from the image data controller the capacity of the image data to be prepared and the position of the HD, in which the image data is finally stored, by sending the Storing Req 101 to the image data controller. The image data controller, having received this Storing Req 101, searches the sequence of contiguous memory locations capable of storing the image data requested in RAM (a) or RAM (b).

Now, assuming that it is decided that storage is possible in RAM (a), then the image data controller sets image path A as the source address (specifically, addresses differ according to the image input unit: the fixed address, if it is the scanner, and the initial address of the memory which stores the internally developed image, if it is the RIP of the PDL), image path B (specifically, the initial address of the storing area found in RAM (a)) as the destination address, and the image size requested, in the DMA controller (not illustrated) as the transfer byte numbers.

At the point where preparation is completed for transfer of the image data such as DMA transfer, the signal Storing Ready 102 is returned to the image input unit. The image data controller sends Storing Ready 102 to the image input unit and, simultaneously, sends Estimated Image to the image output unit. After receiving Storing Ready 102, the image input unit starts to transfer the image data.

When transfer of the image data is completed, the DMA controller generates the data transfer completion interrupt, and then, the image input unit, having received this interrupt, sends the signal Storing Completed 104 to the image data controller. The image data controller, having received the Storing Completed 104, starts image transfer from RAM (a) to the HD. Setting of the image data transfer from image path A to image path B is carried out for the DMA controller (not illustrated) and the PC1 controller (also not illustrated).

When this transfer is completed, the DMA controller generates the data transfer completion interrupt, and then, the image data controller, having received this interrupt, checks the counting semaphore (Direct Reading) 401 of this image and deletes the image data reserved in RAM (a), if the semaphore has not been captured.

Figure 15:
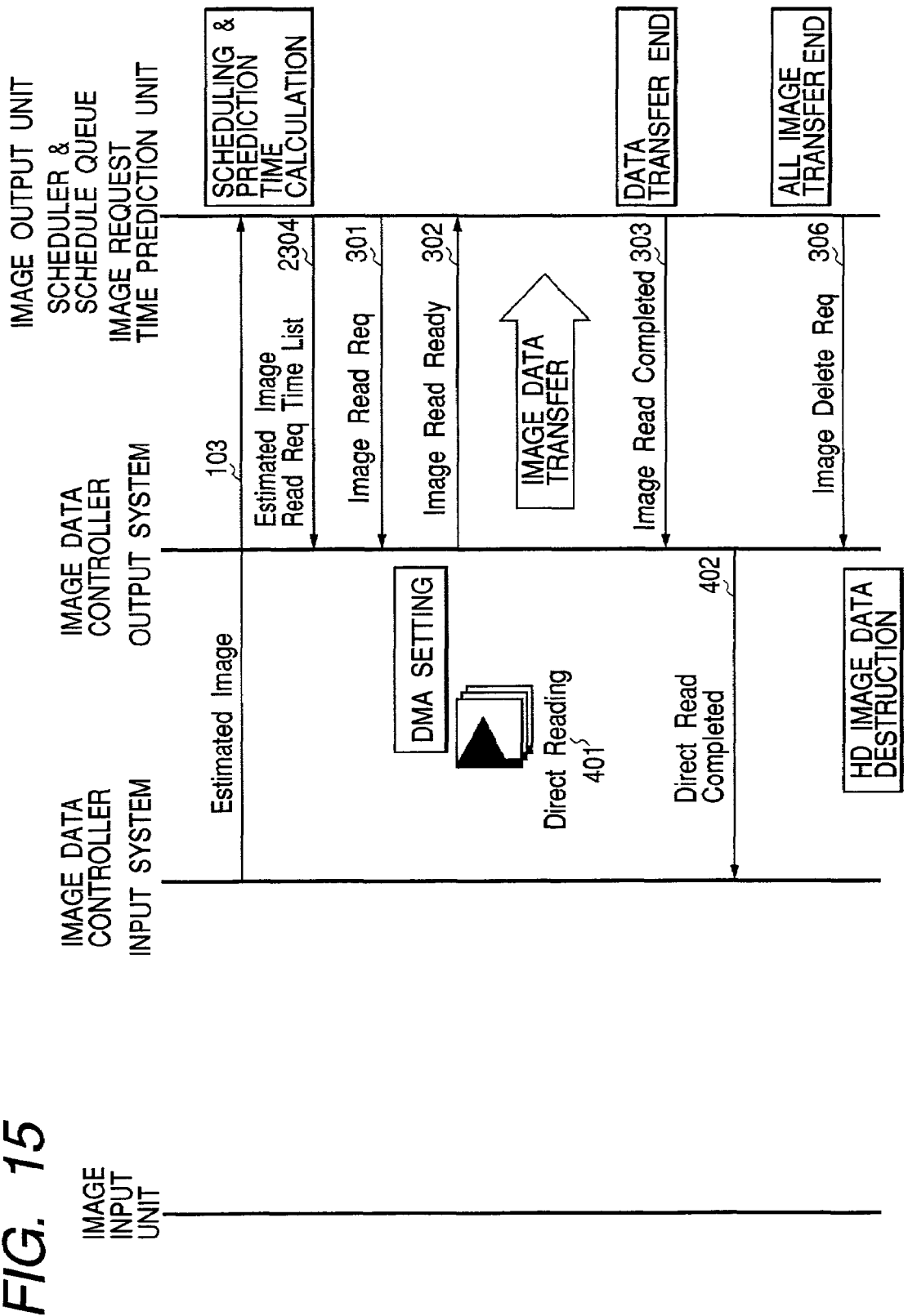
FIG. 15 shows procedures of controlling output system normal operations in the fourth embodiment.

Next, with reference to FIG. 15, the normal operation of the output system will be described.

At the point where the Estimated Image 103 is received from the image data controller, the output operation is started.

The image output unit, having received Estimated Image 103, starts preparations necessary for image output of the data, and simultaneously, transfers such information as precedence of the order of printing to the scheduler. Then, the scheduler decides the print schedule based on that information and sets up or modifies the print schedule queue accordingly.

The image request time prediction unit, in the print schedule queue, to output before image n, for respective (k), which has not yet read the image data, seeks the time Tp(k) for carrying the output paper and the inter-paper time Td(k) to be taken between successive sheets of output paper, and seeks the image data request prediction time Te(n), to return this value as image data request prediction time list information (Estimated Image Read Req Time List) 2304 to the image data controller:

$$Te(n)=\text{SUM}(Tp(i)+Td(i))$$

i=0 to −1

Td(0) is the time for carrying a sheet of paper from the feeding cassette to the printing position.

The image data controller stores the Estimated Image Read Req Time List 2304 returned as Tdirect(n), seeks storing time Tr1(j) of the image data j, which has been stored already or is to be stored in the RAM, to be stored in the RAM, storing time Th(j) from the RAM to the HD, and storing time Tr2(j) from the HD to the RAM, and calculates the total Tnormal thereof:

$$Tnormal(j)=Tr1(j)+Th(j)+Tr2(j)$$

The image data controller releases, for the image of which Tdirect(j) is later than Tnormal(j), one of the counting semaphores (Direct Reading) 401 of the image which has been stored in the HD (if there is no semaphore, there is no release), to release the RAM. Nothing is done for an image storage of which in the HD has not been completed.

At the point where video input preparation of the printer is completed, the image output unit sends Image Read Req 301 to the image data controller. The image data controller, having received Image Read Req 301, prepares for reading the image from the HD.

First, the sequence of contiguous memory locations capable of storing specified image data is searched in RAM (a) or RAM (b). Assuming by way of example that such locations are found from RAM (b), the image data controller sets, in the DMA controller (not illustrated) and the PC1 controller (not illustrated), the initial address of the image data stored in the HD as the source, the initial address of the area found in RAM (b) as the destination, and the size of the image data requested as the transfer byte number to start transfer. When transfer is completed and the data transfer completed interrupt is sent from the DMA controller, the image data controller sets the DMA from RAM (b) to the image output unit.

At the point where setting of the DMA the controller is completed, the image data controller sends Image Read Ready 302 to the image output unit. The image output unit, having received this Image Read Ready 302, informs the printer of the start of image data transfer. The image output unit, in which data transfer is completed and the transfer interrupt from the DMA is received, sends Image Read Completed 303 to the image data controller. The image data controller, having received Image Read Completed 303, releases one of the counting semaphores (Direct Reading) 401 of the image. (If nothing has been received, there is no release.) The image output unit completes the predetermined image output and sends Image Delete Req 306 for the image data that is now unnecessary to the image data controller. The image data controller, having received this Image Delete Req 306, deletes the specified image data in the HD.

Figure 16:
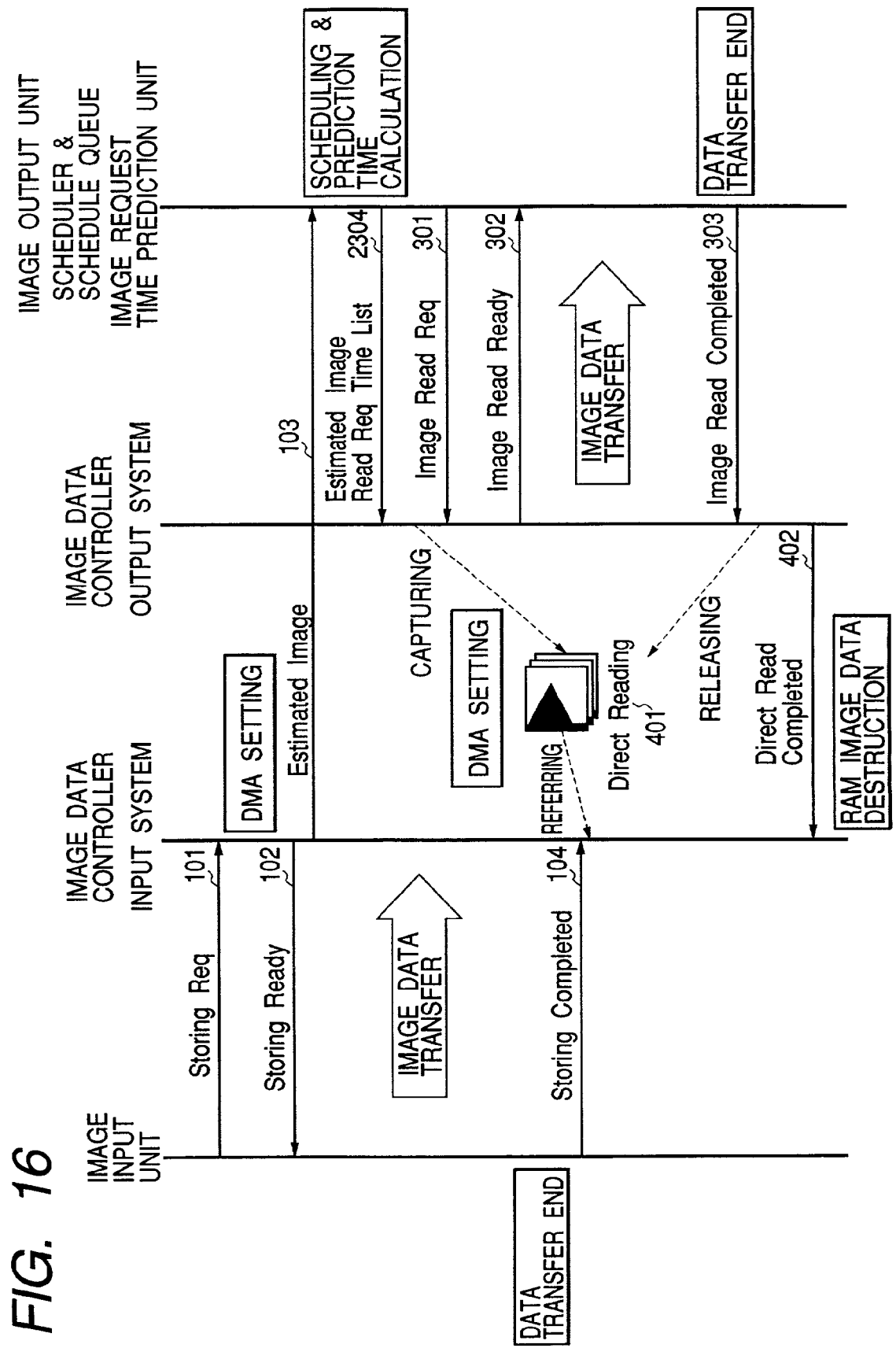
FIG. 16 shows procedures of controlling RAM sharing operations in the fourth embodiment.

Next, with reference to FIG. 16, the RAM sharing operation will be described.

The image data controller executes sharing of the RAM with the output system for an image in which Tdirect(j) is shorter than Tnormal(j). For an image storage of which in the HD has been completed, nothing is done. For an image storage of which in the HD has not been completed, the image data controller first captures one of the counting semaphores (Direct Reading) 401 of this image to prevent deletion of the image data in the RAM after completion of storage by the input system in the HD.

Next, when the output system receives the Image Read Completed 303 for this image, as described above, the output system releases one of the counting semaphores (Direct Reading) 401. In the input system, at the point of completion of storage in the HD as described above, the counting semaphores (Direct Reading) 401 is checked and, the semaphore has been captured, the input system awaits Direct Read Completed 402, to indicate the release of all the counting semaphores 401, from the output system before deleting the contents of the RAM.

If, before completion of storing operation from the RAM to the HD, if the Image Read Req 301 is performed on this image several times, then until the Image Read Completed 303 for each of the respective sets of Image Read Req 301 is received, the contents of the RAM cannot be deleted even if storage in the HD has been completed.

The image data controller, in the status of executing sharing of the RAM with the output system, releases one of the counting semaphores (Direct Reading) 401 reserved to delete the contents of the RAM, when no image request comes after the predicted image request time Tdirect(j) has passed When the RAM is shared, storage in the HD is parallel executed.

(Benefit of the Fourth Embodiment)

According to this embodiment, the image processing device has a RAM in which image data is stored, a HD in which image data is stored, an image input unit in which image data is formed and stored in the RAM, an image output unit to read the image data from the RAM to print the data on output paper, and an image data controller to write the image data stored in the RAM in the HD and, according to the output direction of the image output unit, the image data stored in the HD in the RAM. On the basis of a scheduler to decide an order in which to output the image output from image information and scheduling information from the scheduler in completion of the schedule, the image processing device has prediction means to predict the time required until the image output unit requests each body of image data, starts to store the image data and simultaneously to send image information to the scheduler, executes scheduling, seeks the predicted time Te(n) of each image, compares the predicted time of the image (k) which has been stored in the RAM or will be stored in the RAM, with time Tn(k), for which the same image is once stored in the HD and storage of which in the RAM again is complete, outputs the image from the RAM of the image input unit, when the RAM storing completed time Tn(k) is later than the predicted time Te(k), to the image output unit, the RAM contents are deleted by waiting for storage of the image, where the image has not been stored in the HD, or immediately for an image the storage of which in the HD has been completed, when the predicted time Te(k) is later than the RAM storing completed time Tn(k), to make possible the high speed FCOT without use of expensive RAM and HD.

Figure 17:
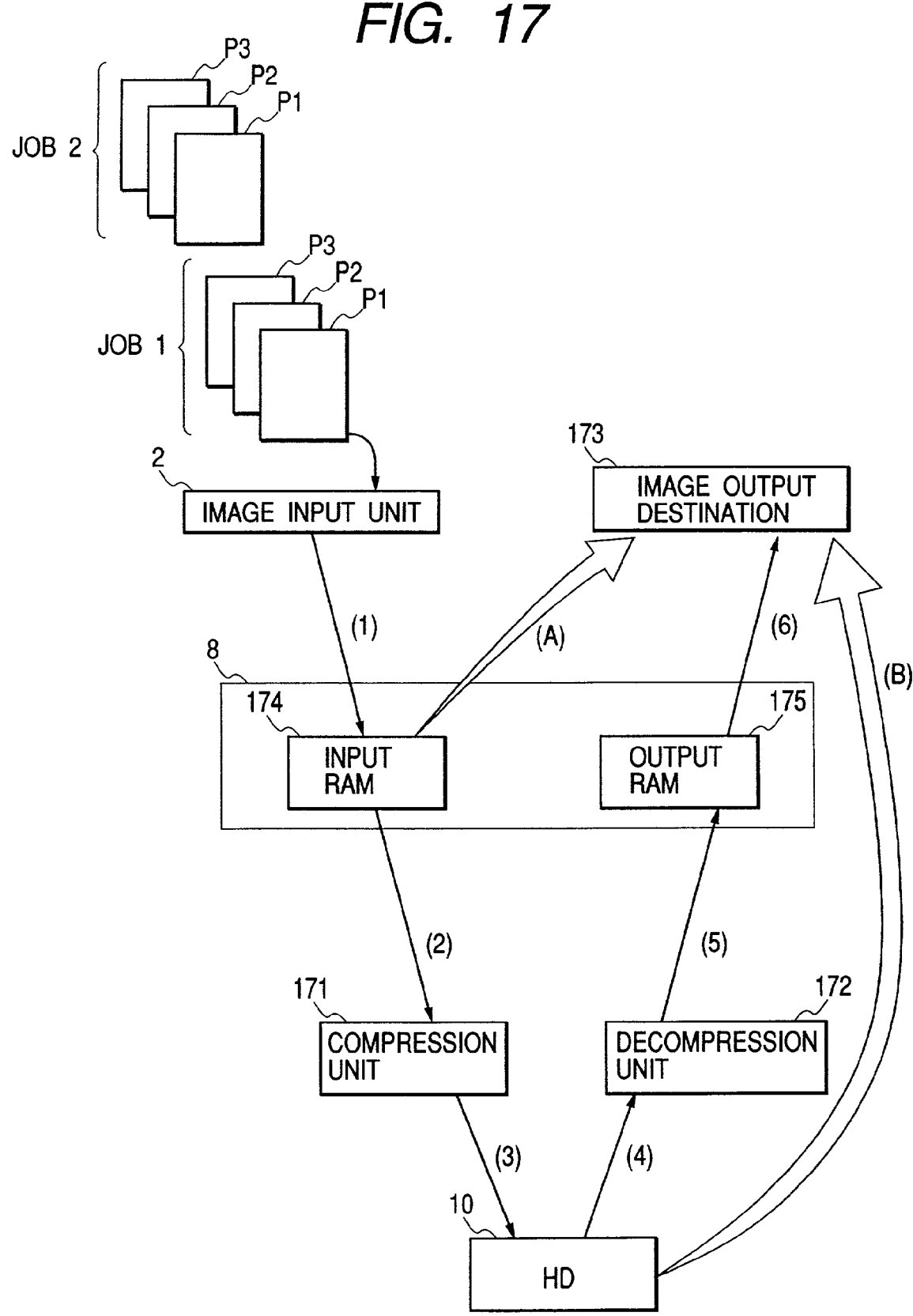
FIG. 17 is a diagram for illustrating data transfer control in this embodiment.

On the basis of the above described embodiments 1 to 4, with reference to FIG. 17, data transfer control including the RAM sharing operation in this embodiment will be described using one example.

Herewith, cases of processing of JOB 1, composed of three pages, followed by JOB 2, also composed of three pages, will be described.

The image data inputted in the image input unit 2 is exemplified by the image data of a copy mode, the image data of a print mode, and the image data of a facsimile receiving mode. In addition, in this example, the image output destination 173 is assigned to the image-forming unit belonging to the same device.

In the image input unit 2, the image data is adapted to be input sequentially from an initial page. The image data controller 4 decides a data transfer path through which the image data P1 of the JOB1 stored in the input RAM 174 is transferred from the image input unit 2 to the image output destination 173, on the basis of the situation of the image output destination 173.

For example, for the image output destination 173, at the current point, when the image data P1 of the JOB1 is transferred to the image output destination 173, in the case where in the image output destination 173 side decides the status is not suitable for immediate processing of the image data P1 (for example, a case where there is already a processing job in the image output destination 173, which is currently awaiting printing, or, for example, cases of error status, toner end, paper out, memory full, etc.), a data transfer path is selected to store the image data P1 of the JOB1 from the input RAM 174 to the hard disk 10 through a compression unit 171 to store in the hard disk 10.

In this case, the image data P1 is deleted from the RAM 174 without being held in the input RAM 174, and the RAM 174 is released for a following page (in this case, P2 of the JOB1) to make it possible to store the following page in the input RAM 174. According to these steps, FCOT and also the overall efficiency of processing of the overall job can be improved.

According to the fact that processing becomes possible at the image output destination 173 side (for example, all preceding jobs are processed), the image data P1 stored in the hard disk 10 is transferred to the image output destination 173 through the transfer path (route B) comprising, in this order, the hard disk 10, a decompression unit 172, the output RAM 175, and the image output destination 173. During these steps, the following pages such as P2 and P3 of JOB1 are sequentially transferred from the input RAM 174 to the HD 10 for storage in the HD. In other words, processing is executed parallel. By virtue of this, the productivity or efficiency of processing of all jobs is further increased.

On the other hand, at the point where the image data P1 of JOB1 is stored from the image input unit 2 in the input RAM 174, in a case where the image output destination 173 side decides that the status is suitable for immediate processing of the image data P1 (for example, a case where there is no preceding job in idling status at the image output destination 173, or a case where even if there is such a preceding job already, that job has lower precedence that does JOB1), the data transfer path including route B of the sequence comprising the input RAM 174, the compression unit 171, the hard disk 10, a decompression unit 172, the output RAM 175, and the image output destination 173 is not selected, but the data transfer path (route A) comprising in this order the input RAM 174 and the image output destination 173 is selected. In other words, the image data P1 of the JOB1 is directly transferred from the input RAM 174 to the image output destination 173.

Even during these steps, following pages such as P2 and P3 of the image data of JOB1 are transferred sequentially from the input RAM 174 to the hard disk 10 to execute parallel processing for storage in the HD.

However, at the point in which the P2 of the JOB1 is stored from the image input unit 2 to the input RAM 174, processing of the image data P1 has been completed at the image output destination 173 side, and immediately, in the case where it has been decided that the status is one in which the system is capable of processing the image data P2, the P2 of JOB1 is transferred directly to the image output destination 173 through route A.

As described above, a decision is made for each page whether route A should be selected or the transfer path including Route B should be selected. In other words, even the initial page of the job does not always follow route A. In addition, even an intermediate page during the job does not always follow the data transfer-path including route B. According to the situation of the image output destination 173, a decision is made for each page whether route A or the transfer path including Route B should be selected.

For reference, concerning the intermediate page (not the initial page) during the job, regardless of an operation mode of the above-described image output destination 173 side, control may be conducted to select always the data transfer path including Route B.

As similar to the above described processing, for JOB2 following JOB1, the data transfer path is decided for each page.

In this example, the image output destination 173 was described as the image forming unit installed inside the device. Regardless of this example, when the image output destination 173 is another, remote-controlled image forming apparatus (such as another printer, copier, and or facsimile apparatus), controlling is similarly carried out. As other external apparatus, a host computer, and a filing apparatus to execute storing and searching processing of the image data, can suitably employ the processing of the present invention. It should also be mentioned that controlling is adapted to be carried out as follows: the image data, which has been stored in the RAM and is to be transferred to the image output destination 173, can be immediately processed at the image output destination 173 side, and then, transferred directly from the RAM to the image output destination 173 to be impossible immediate processing in the image output destination 173 and then, transferred to the image output destination 173 through the hard disk 10.

As a method to decide whether the status is suitable or proper for processing of the image data P1 immediately at the image output destination 173 side may be used a decision by performing processing using the image data request prediction time and the like such as the above described embodiments 1 to 4 or may be a decision based on knowing the status (status information) of the image output destination 173 side. When the status (status information) of the image output destination 173 side is known by the image data controller 10, the decision is made, for example, on the basis of information (information such as print, print waiting, JOB precedence, idling status, error status, paper out, toner end, memory full, and the like) expressing the status of the image output destination from the image output destination 173. For reference, in this step, a configuration may be that status request information is sent from the image data controller 10 and then status is captured from the image output destination 173 side. In addition, the configuration may be that when the image output destination 173 has completed preparation of receiving the image data, information showing this status is sent from the image output destination 173 side to make receiving the information by the image data controller 10 possible, and finally according to the status in which the information has been received or not, makes decision as described above.

Needless to say, the present invention is achieved by the fact that a memory medium, in which a program code of software to realize a function of respective embodiments as described above is stored, is supplied to a system or an apparatus and then a computer (or a CPU or MPU) of the system or the apparatus reads out the program code, stored in the memory medium, for execution.

In this case, the program code itself read from the memory medium realizes a new function of the present invention and therefore, the memory medium, in which the program code has been stored, is an embodiment of the present invention.

As the memory medium to provide the program code, for example, a diskette, hard disk, magneto-optical disk, optical disk, CD-ROM, CD-R, magnetic tape, nonvolatile memory card, and ROM can be used.

By executing the program code read by the computer, the function of the embodiments described above is realized. In addition, on the basis of specification of the program code, an OS and the like operated on the computer executes a part or all of a real processing, and by this manner of processing, also, the function of the embodiments as described above can be realized.

Furthermore, after the program code read out from a memory medium is written in a memory mounted on a function-extending board installed in the computer and a function-extending unit connected to the computer, on the basis of specification of the program code, the function-extending board and the CPU mounted on the function-extending unit execute a part or all of the real processing, and the function of the embodiments as described above can be realized by this processing.

Needless to say, the present invention can be applied to a case where the program is distributed from the memory medium, in which the program code of the software to realize the function of embodiments as described above has been recorded, to a requester through a communication line such as PC communication (e.g., a network).

As described above, according to the present invention, the image processing apparatus, in which a speed of an external output such as the printer has been made higher, an image processing method, and the memory medium, in which a control program therefor is stored, can be realized.

Also according to the present invention, by using the current system and by considering a complicated operation, the image processing apparatus, in which a speed of the FCOT has been made as high as possible, the image processing method, and the memory medium, in which the control program therefor is stored, can be realized.

What is claimed is:

1. An image processor comprising:
   image inputting means for inputting image data and storing the image data in a RAM;
   first controlling means for storing in a bulk memory the image data stored in the RAM;
   second controlling means for storing in the RAM the image data stored in the bulk memory, followed by outputting the image data to an external device from the RAM;
   third controlling means for outputting the image data stored in the RAM directly to the external device, without operating said first controlling means and said second controlling means; and
   determining means for determining whether or not said third controlling means is operated,
   wherein said determining means operates said third controlling means based on whether or not image data can be transmitted to the external device at a time shorter than a reference time.

2. A processor according to claim 1, wherein said determining means makes a determination in accordance with the operation mode of the external device.

3. A processor according to claim 1, wherein a hard disk device is used as the bulk memory.

4. A processor according to claim 1, wherein a printer or a facsimile machine is used as the external device.

5. An image processor comprising:
   a RAM storing image data;
   inputting means for storing inputted image data in said RAM;
   bulk storing means for storing image data;
   comparing means for comparing a time Te when an external device requires image data with a time Tn when the image data stored in said bulk storing means is completely stored in said RAM; and
   outputting means for reading the input image data already stored in said RAM and supplying the same to the external device without transferring the image data from said bulk storing means to said RAM, if it is determined by said comparing means that said time Te is earlier that said time Tn.

6. A processor according to claim 5, wherein a hard disk is used as said bulk storing means.

7. An image processor comprising:
   a RAM storing image data;
   inputting means for storing inputted image data in said RAM;
   bulk storing means for storing image data;
   transfer controlling means for storing in said RAM the image data stored in said bulk storing means; and
   output controlling means for comparing a time $Te(n, k)$ when image data k is required in an external device ($n=1, 2, \ldots$) with a time $Tn(k)$ when the image k is stored in said bulk memory from said RAM, and is stored again in said RAM completely, and if at least one of all the $Te(n, k)$ are earlier than the $Tn(k)$, outputting the image data to the external device from said RAM.

8. A processor according to claim 7, wherein comparison of said $Te(n, k)$ with said $Tn(k)$ is performed for each n, and $r(k)$, and the result thereof is each stored in $R(n, k)$.

9. A processor according to claim 8, wherein when Tn is earlier for all in said $R(n, k)$ as a result of said comparison, the image data of said RAM is immediately deleted if it is already stored in said bulk storing means, and on the other hand, the image data is deleted after the image data is stored in said bulk storing means if it is not yet stored therein.

10. A processor according to claim 7, further comprising a plurality of image output units wherein at least one of such image output units have a printer function of printing image data on a paper medium.

11. A processor according to claim 10, wherein at least one of said plurality of image output units has a function of sending image data to a network.

12. A processor according to claim 10, wherein at least one of said plurality of image output units has a function of generating FAX data from image data.

13. A processor according to claim 10, wherein processing of storage in said bulk storing means is carried out in parallel even while image data is outputted from said RAM to said image output unit.

14. A processor according to claim 7, wherein calculation of said $Te(n, k)$ is performed each time output order is changed in each the external device, and the calculated $Te(n, k)$ is sent to said output controlling means.

15. A processor according to claim 7, wherein calculation of said $Tn(k)$ is performed each time said $Te(n, k)$ from each the external device is received.

16. A processor according to claim 7, wherein comparison of said $Te(n, k)$ with said $Tn(k)$ is performed by:
   (1) selecting the earliest of the $Te(n, k)$, that is $Tn(k)$, and
   (2) comparing the $Te(k)$ with the $Tn(k)$.

17. A processor according to claim 7, wherein comparison of said $Te(n, k)$ with said $Tn(k)$ is performed by:
   (1) selecting the smallest of the n (i=no),
   (2) comparing the $Te(i, k)$ with the $Tn(k)$,
   (3) ending comparison if the $Tn(k)$ is later,
   (4) selecting next n if present (i=n1), when the $Tn(k)$ is earlier, and
   (5) ending comparison if the $Tn(k)$ is earlier and there is no remaining n.

18. A processor according to claim 7, wherein said inputting means has a scanner function of reading a manuscript to create image data.

19. A processor according to claim 7, wherein said inputting means has a function of creating image data from PDL data.

20. A processor according to claim 7, wherein said inputting means has a FAX development function of creating image data from FAX data.

21. An image processor comprising:
   a RAM for storing image data;
   bulk storing means for storing image data;
   image inputting means for creating image data and storing the same in said RAM, image outputting means for reading image data from said RAM and outputting the same;

controlling means for storing in said bulk storing means the image data stored in said RAM, and storing in said RAM the image data stored in said bulk storing means in accordance with output instructions of said image outputting means; and predicting means for predicting a nonrequest term until a time when said image outputting means requires image data, wherein the nonrequest term of image data is determined upon start of storage of the image data, said nonrequest term is compared with a term until a time when the same image data is stored in said bulk storing means on a temporary base, and is again stored in said RAM completely, and if said RAM storage completion term comes later than said nonrequest term, image data is outputted to said image outputting means from said RAM in which the image data is stored by said image inputting means.

22. A processor according to claim 21, wherein said image inputting means has a scanner function of reading a manuscript to create image data.

23. A processor according to claim 21, wherein said image inputting means has a function of creating image data from PDL data.

24. A processor according to claim 21, wherein said image inputting means has a FAX development function of creating image data from FAX data.

25. A processor according to claim 21, wherein said image outputting means has a printer function of printing image data on a paper medium.

26. A processor according to claim 21, wherein image outputting means has a function of sending image data to a network.

27. A processor according to claim 21, wherein said image outputting means has a function of generating FAX data from image data.

28. A processor according to claim 21, wherein processing of storage in said bulk storing means is carried out in parallel even while image data is outputted to said image outputting means from said RAM associated with said image inputting means.

29. A processor according to claim 21, wherein a hard disk is used as said bulk storing means.

30. An image processor comprising:
a RAM for storing image data;
bulk storing means for storing image data;
image inputting means for creating image data and storing the same in said RAM;
image outputting means for reading image data from said RAM and outputting the same;
controlling means for storing in said bulk storing means the image data stored in said RAM, and storing in said RAM the image data stored in said bulk storing means in accordance with output instructions of said image outputting means; and
predicting means for predicting a time when said image outputting means requires image data,
wherein the predicted time of image data is determined upon start of storage of the image data,
the predicted time is compared with a time when the same image data is stored in said bulk storing means on a temporary base and stored again in said RAM completely,
if said RAM storage completion time is later than said predicted time, image data is outputted to said image outputting means from said RAM in which the image data is stored by said image inputting means, and
if image data is not requested even after the predicted time, said RAM is released.

31. A processor according to claim 30, wherein said image inputting means has a scanner function of reading a manuscript to create image data.

32. A processor according to claim 30, wherein said image inputting means has a function of creating image data from PDL data.

33. A processor according to claim 30, wherein said image inputting means has a FAX development function of creating image data from FAX data.

34. A processor according to claim 30, wherein said image outputting means has a printer function of printing image data on a paper medium.

35. A processor according to claim 30, wherein said image outputting means has a function of sending image data to a network.

36. A processor according to claim 30, wherein said image outputting means has a function of generating FAX data from image data.

37. A processor according to claim 30, wherein processing of storage in said bulk storing means is carried out in parallel even while image data is outputted to said image outputting means from said RAM associated with said image inputting means.

38. A processor according to claim 30, wherein a hard disk is used as said bulk storing means.

39. An image processor comprising:
a RAM for storing image data;
bulk storing means for storing image data,
image inputting means for creating image data and storing the same in said RAM;
image outputting means for reading image data from said RAM and outputting the same;
controlling means for storing in said bulk storing means the image data stored in said RAM, and storing in said RAM the image data stored in said bulk storing means in accordance with output instructions of said image outputting means;
a scheduler determining image output order based on the image information outputted from said image outputting means; and
predicting means for predicting a time when each body of image data is required by said image outputting means, based on the scheduling information from said scheduler, at the completion of a predetermined schedule,
wherein said image outputting means has a function of sending image data to a network.

40. A processor according to claim 39, wherein said image inputting means has a scanner function of reading a manuscript to create image data.

41. A processor according to claim 39, wherein said image inputting means has a function of creating image data from PDL data.

42. A processor according to claim 39, wherein said outputting means has a printer function of printing image data on a paper medium.

43. A processor according to claim 39, wherein processing of storage in said bulk storing means is carried out in parallel even while image data is outputted to said image outputting means from said RAM associated with said image inputting means.

44. A processor according to claim 39, wherein a hard disk is used as said bulk storing means.

45. An image processor comprising:
a RAM for storing image data;
bulk storing means for storing image data,
image inputting means for creating image data and storing the same in said RAM;
image outputting means for reading image data from said RAM and outputting the same;
controlling means for storing in said bulk storing means the image data stored in said RAM, and storing in said RAM the image data stored in said bulk storing means in accordance with output instructions of said image outputting means;
a scheduler determining image output order based on the image information outputted from said image outputting means; and
predicting means for predicting a time when each body of image data is required by said image outputting means, based on the scheduling information from said scheduler, at the completion of a predetermined schedule,
wherein image information is sent to said scheduler to perform scheduling upon start of storage of image data,
the predicted time Te(n) is determined by said predicting means in response to an output of said scheduler,
the predicted time of an image (k) that is stored in said RAM is compared with a time Tn(k) when the same image is stored in said bulk storing means, and is stored again in said RAM completely,
if said RAM storage completion time Tn(k) is later than said predicted time Te(k), image data is outputted to said image outputting means from said RAM associated with said image inputting means, and
if said predicted time Te(k) is later than said RAM storage completion time Tn(k), storage is awaited with respect to image data that is not yet stored in said bulk storing means, and image data stored in said RAM that is also already stored in said bulk storing means is deleted from said RAM.

46. An image processor comprising:
a RAM;
bulk storing means for storing image data,
image inputting means for creating image data and storing the same in said RAM;
image outputting means for reading the image data from said RAM and outputting the same;
controlling means for storing in said bulk storing means the image data stored in said RAM, and storing in said RAM the image data stored in said bulk storing means in accordance with output instructions of said image outputting means;
a scheduler determining image output order based on the image information outputted from said image outputting means; and
predicting means for predicting a time when each body of image data is required by said image outputting means, based on the scheduling information from said scheduler, at completion of a predetermined schedule,
wherein said image inputting means has a FAX development function of creating image data from FAX data.

47. An image processor comprising:
a RAM;
bulk storing means for storing image data,
image inputting means for creating image data and storing the same in said RAM;
image outputting means for reading the image data from said RAM and outputting the same;
controlling means for storing in said bulk storing means the image data stored in said RAM, and storing in said RAM the image data stored in said bulk storing means in accordance with output instructions of said image outputting means;
a scheduler determining image output order based on the image information outputted from said image outputting means; and
predicting means for predicting a time when each body of image data is required by said image outputting means, based on scheduling information from said scheduler, at completion of a predetermined schedule,
wherein said image outputting means has a function of generating FAX data from image data.

48. An image processing method comprising:
an image inputting step of inputting image data and storing the same in a RAM;
a first controlling step of storing in a bulk memory the image data stored in the RAM;
a second controlling step of storing in the RAM the image data stored in the bulk memory, followed by outputting the image data to an external device from the RAM;
a third controlling step of outputting the image data stored in the RAM directly to the external device, without performing said first controlling step and said second controlling step; and
a determining step of determining whether or not said third controlling step is performed,
wherein said determining step includes performing said third controlling step based on whether or not image data can be transmitted to the external device at a time shorter than a reference time.

49. An image processing method comprising:
an inputting step of storing inputted image data in a RAM;
a comparing step of comparing a time Te when an external device requires image data from the RAM with a time Tn when image data stored in bulk storing means is completely stored in the RAM; and
an outputting step of reading the input image data already stored in the RAM and supplying the same to the external device without transferring the image data from the bulk storing means to the RAM, if it is determined through said comparing step that the time Te is earlier than the time Tn.

50. An image processing method comprising:
an inputting step of storing inputted image data in a RAM;
a transfer controlling step of storing in the RAM the image data stored in bulk storing means; and
an output controlling step of comparing a time Te(n, k) when image data k is required in an external device n (n=1, 2, . . . ) with a time Tn(k) when the image k is stored in the bulk memory from the RAM, and is stored again in the RAM completely, and if at least one of all the Te(n, k) are earlier than the Tn(k), outputting the image data to the external device from the RAM.

51. An image processing method comprising:
an image inputting step of creating image data and storing the same in a RAM;
an image outputting step of reading image data from the RAM and outputting the same;
a controlling step of storing in bulk storing means the image data stored in the RAM, and storing in the RAM the image data stored in the bulk storing means in accordance with output instructions of said image outputting step; and
a predicting step of predicting a nonrequest term until a time when said image outputting step requires image data, wherein the nonrequest term of image data is determined upon start of storage of the image data, the nonrequest term is compared with a term until a time when the same image data is stored in the bulk storing means on a temporary basis, and is again stored in the RAM completely, and if the RAM storage completion term comes later than the nonrequest term, image data is outputted from the RAM in which the image data is stored through said image inputting step.

52. An image processing method comprising:

an image inputting step of creating image data and storing the same in a RAM;

an image outputting step of reading image data from the RAM and outputting the same;

a controlling step of storing in bulk storing means the image data stored in the RAM, and storing in the RAM the image data stored in the bulk storing means in accordance with output instructions of said image outputting step; and a predicting step of predicting a time when image data is required in said image outputting step, wherein the predicted time is determined of image data upon start of storage of the image data, the predicted time is compared with a time when the same image data is stored in the bulk storing means on a temporary base and stored again in the RAM completely, if the RAM storage completion time is later than the predicted time, image data is outputted from the RAM in which the image data is stored through said image inputting step, and if image data is not requested even after the predicted time, the RAM is released.

53. An image processing method comprising:

an image inputting step of creating image data and storing the same in a RAM;

an image outputting step of reading image data from the RAM and outputting the same;

a controlling step of storing in bulk storing means the image data stored in the RAM, and storing in the RAM the image data stored in the bulk storing means in accordance with output instructions of said image outputting step;

a scheduling step of determining image output order based on the image information outputted in said image outputting step; and a predicting step of predicting a time when each body of image data is required in said image outputting step, based on scheduling information from said scheduling step, at completion of a predetermined schedule, wherein said image outputting step includes sending image data to a network.

54. A computer-readable storage medium storing in the form of a readable program:

an image inputting step of inputting image data and storing the same in a RAM;

a first controlling step of storing in a bulk memory the image data stored in the RAM;

a second controlling step of storing in the RAM the image data stored in the bulk memory, followed by outputting the image data to an external device from the RAM;

a third controlling step of outputting the image data stored in the RAM directly to the external device, without performing said first controlling step and said second controlling step; and a determining step of determining whether or not said third controlling step is performed, wherein said determining step includes performing said third controlling step based on whether or not image data can be transmitted to the external device at a time shorter than a reference time.

55. A computer-readable storage medium storing in the form of a readable program:

an inputting step of storing inputted image data in a RAM;

a comparing step of comparing a time Te when an external device requires image data with a time Tn when the image data stored in bulk storing means is completely stored in the RAM; and an outputting step of reading the input image data already stored in the RAM and supplying the same to the external device without transferring the image data from the bulk storing means to the RAM, if it is determined through said comparing step that the time Te is earlier than the time Tn.

56. A computer-readable storage medium storing in the form of a readable program:

an inputting step of storing inputted image data in a RAM;

a transfer controlling step of storing in the RAM the image data stored in bulk storing means; and an output controlling step of comparing a time Te(n, k) when image data k is required in an external device n (n=1, 2, . . . ) with a time Tn(k) when an image k is stored in the bulk memory from the RAM, and is stored again in the RAM completely, and if at least one of all the Te(n, k) are earlier than the Tn(k), outputting the image data to the external device from the RAM.

57. A computer-readable storage medium storing a procedure in the form of a readable program, said procedure comprising:

an image inputting step of creating image data and storing the same in a RAM;

an image outputting step of reading image data from the RAM and outputting the same;

a controlling step of storing in bulk storing means the image data stored in the RAM, and storing in the RAM the image data stored in the bulk storing means in accordance with output instructions of said image outputting step; and a predicting step of predicting a nonrequest term until the time when said image outputting step requires image data, wherein the nonrequest term of image data is determined upon start of storage of a given body of image data, the nonrequest term is compared with a term until the time when the same image data is stored in the bulk storing means on a temporary basis, and is again stored in the RAM completely, and if the RAM storage completion term comes later than the nonrequest term, image data is outputted from the RAM in which the image data is stored through said image inputting step.

58. A computer-readable storage medium storing a procedure in the form of a readable program, said procedure comprising:

an image inputting step of creating image data and storing the same in a RAM;

an image outputting step of reading image data from the RAM and outputting the same;

a controlling step of storing in bulk storing means the image data stored in the RAM, and storing in the RAM the image data stored in the bulk storing means in accordance with output instructions of said image outputting step; and a predicting step of predicting a time when image data is required in said image outputting step, wherein the predicted time is determined for a given body of image data upon start of storage of that image data, the predicted time is compared with a time when the same image data is stored in the bulk storing means on a temporary base and stored again in the RAM completely, if the RAM storage completion time is later than the predicted time, image data is outputted from the RAM in which the image data is stored through said image inputting step, and if image data is not requested even after the predicted time, the RAM is released.

59. A computer-readable storage medium storing in the form of a readable program:

an image inputting step of creating image data and storing the same in a RAM;

an image outputting step of reading image data from the RAM and outputting the same;

a controlling step of storing in bulk storing means the image data stored in the RAM, and storing in the RAM the image data stored in the bulk storing means in accordance with output instructions of said image outputting step;

a scheduling step of determining image output order based on the image information outputted in said image outputting step; and a predicting step of predicting a time when each body of image data is required in said image outputting step, based on scheduling information in said scheduling step, at completion of a predetermined schedule, wherein said image outputting step includes sending image data to a network.

60. An image processing method comprising:

a bulk storing step, of storing image data in bulk storing means;

an image inputting step of, creating image data and storing the same in a RAM;

an image outputting step, of reading image data from the RAM and outputting the same;

a controlling step, of storing in the bulk storing means the image data stored in the RAM, and storing in the RAM the image data stored in the bulk storing means in accordance with output instructions of said image outputting step;

a determining step, of determining image output order based on the image information outputted from said image outputting step; and a predicting step, of predicting a time when each body of image data is required by said image outputting step, based on scheduling information from said determining step, at completion of a predetermined schedule, wherein said image inputting step includes a FAX development function of creating image data from FAX data.

61. An image processing method comprising:

a bulk storing step, of storing image data in bulk storing means;

an image inputting step, of creating image data and storing the same in a RAM;

an image outputting step, of reading image data from the RAM and outputting the same;

a controlling step, of storing in the bulk storing means the image data stored in the RAM, and storing in the RAM the image data stored in the bulk storing means in accordance with output instructions of said image outputting step;

a determining step, of determining image output order based on the image information outputted from said image outputting step; and a predicting step, of predicting a time when each body of image data is required by said image outputting step, based on scheduling information from said determining step, at completion of a predetermined schedule, wherein said image outputting step has a function of generating FAX data from image data.

* * * * *

UNITED STATES PATENT AND TRADEMARK OFFICE
CERTIFICATE OF CORRECTION

PATENT NO. : 7,061,654 B2
APPLICATION NO. : 09/793912
DATED : June 13, 2006
INVENTOR(S) : Hiroyoshi Yoshida It is certified that error appears in the above-identified patent and that said Letters Patent is hereby corrected as shown below:

SHEET 10

"REDICTION" should read --PREDICTION--.

SHEET 11

"REDICTION" should read --PREDICTION--.

COLUMN 3

Line 20, "unit," should read --unit,--.

COLUMN 5

Line 30, "The" should read --the--.

COLUMN 7

Line 49, "steps" should read --step--.

COLUMN 9

Line 43, "been has" should read --has been--.

COLUMN 10

Line 37, "executes" should read --execute--.

COLUMN 12

Line 42, "passed" should read --passed.--.

COLUMN 15

Line 12, "the" (third occurrence) should be deleted; and
Line 60, "passed" should read --passed.--.

COLUMN 20

Line 67, "RAM," should read --RAM;--.

UNITED STATES PATENT AND TRADEMARK OFFICE
CERTIFICATE OF CORRECTION

PATENT NO. : 7,061,654 B2
APPLICATION NO. : 09/793912
DATED : June 13, 2006
INVENTOR(S) : Hiroyoshi Yoshida It is certified that error appears in the above-identified patent and that said Letters Patent is hereby corrected as shown below:

COLUMN 22

Line 32, "data," shold read --data;--.

COLUMN 23

Line 3, "data," should read --data;--;
Line 40, "data," should read --data;--; and
Line 61, "data," should read --data;--;

Signed and Sealed this

Sixteenth Day of January, 2007

JON W. DUDAS
*Director of the United States Patent and Trademark Office*